United States Patent [19]
Yen

[11] Patent Number: 5,627,953
[45] Date of Patent: May 6, 1997

[54] BINARY IMAGE SCALING BY PIECEWISE POLYNOMIAL INTERPOLATION

[76] Inventor: Jonathan Yen, 1431 Pine Grove Way, San Jose, Calif. 95129

[21] Appl. No.: 286,561

[22] Filed: Aug. 5, 1994

[51] Int. Cl.⁶ .................................................. G06F 15/00
[52] U.S. Cl. ............................................................ 395/139
[58] Field of Search .................................... 395/139, 142, 395/141, 140, 155, 161; 345/132, 127

[56] References Cited

U.S. PATENT DOCUMENTS 5,438,654   8/1995  Drebin et al. ........................... 395/139

OTHER PUBLICATIONS

"Cubic Splines for Image Interpolation and Digital Filtering", Hou, Hsieh S. and Andrews, Harry C., IEEE Transactions on Acoustics, Speech, and Signal Processing, vol. ASSP-26, No. 6, Dec. 1978.

"Scaling Binary Images with the Telescoping Template", Ulichney, Robert A. and Troxel, Donald E. IEEE Transactions on Patternn Analysis and Machine Intelligence, vol. PAMI-4, No. 3, 1982, pp. 331-335.

"Resolution Enhancement Technology in Hewlett-Packard LaserJet Printers", Tung, Charles, Hewlett Packard Laboratories, pp. 440-448, 1993.

"B-Spline Curves and Surfaces", Gordon, William J. of General Motors Research Laboratories and Risenfeld, Richard F. of University of Utah, pp. 95-126, Sep. 1974.

"Binary Image Scaling by Piecewise Polynomial Interpolation", Yen, Jonathan Hewlett-Packard Laboratories, Mar. 1994.

"Sysstematic derivation of spline bases", Lempel, Abraham and Seroussi, Gadiel, Computer Aided Geometric Design 9 (1992) 349-363, North-Holland.

"An Explicit Derivation of Discretely Shaped Beta-spline Basis Functions of Arbitrary Order", Seroussi, Gadiel and Barsky, Brian A., Mathematical Methods in Computer Aided Geometric Design II, 1992, pp. 567-584.

"Using B-Splines for Re-Sizing Images", Klassen, Victor R. & Bartels, Richard H., University of Waterloo, Dept. of Computer Science, Computer Graphics Laboratory, Waterloo, Ontario—1986.

"Analysis of Linear Interpolation Schemes for Bi-Level Image Applications", Abdou, Ikram E. & Wong, Kwan Y., IBM J. Res. Develop., vol. 26, No. 6, Nov. 1982.

"Shape Completion", Rutkowski, Wallace S., Computer Graphics and Image Processing 9, 89-101 (1979).

*Primary Examiner*—Phu K. Nguyen

[57] ABSTRACT

A piecewise polynomial interpolation scheme treats images as three-dimensional data in which the X and Y coordinates are the input image dimensions, and the Z coordinate is the intensity of the image. The three-dimensional data set is fitted by a surface, and a resampling process on the fitting surface provides interpolative data. A thresholding process applied on these interpolative data produces a final image output. Based on the interpolating scheme, each output pixel is a weighted average of its neighboring pixels, with weights determined by the type of the interpolant, its degree, and the desired scaling factor. The weights may be pre-calculated for fixed scaling factors, such that the convolution is accomplished by table lookup. Additionally, the resampling process may include a phase shifting to realign said sampling location with respect to an input image.

20 Claims, 17 Drawing Sheets

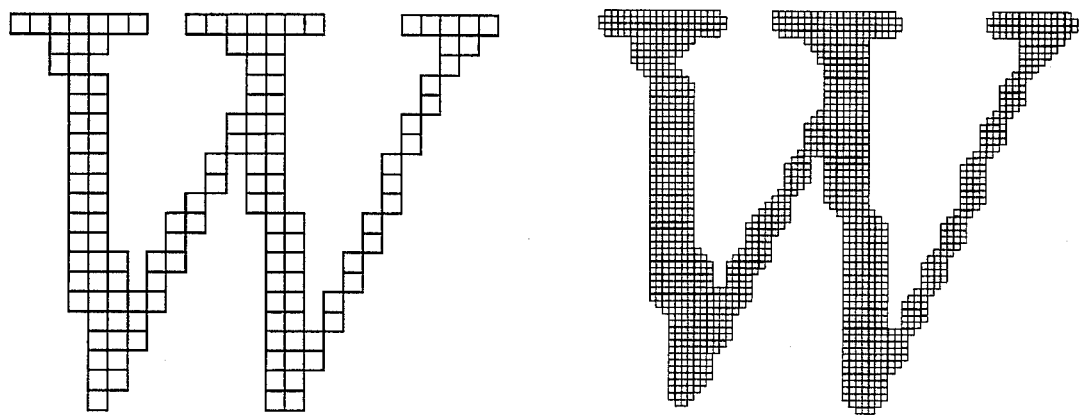
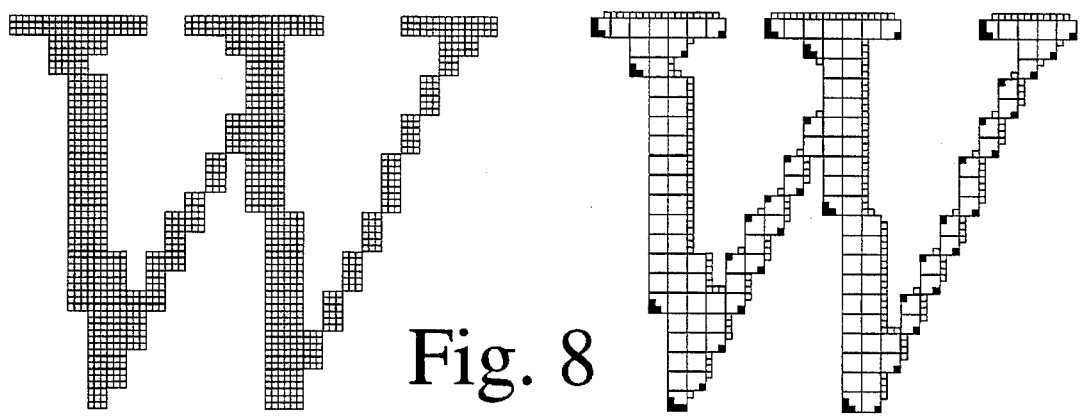
Fig. 8
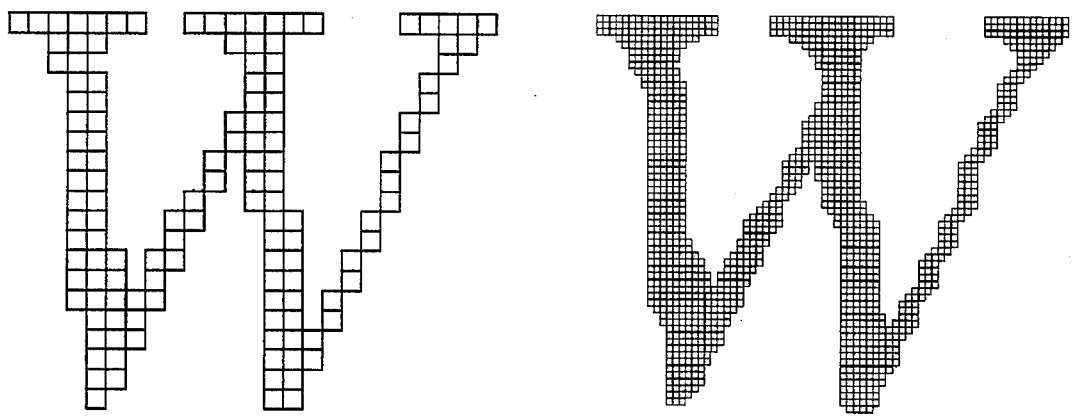
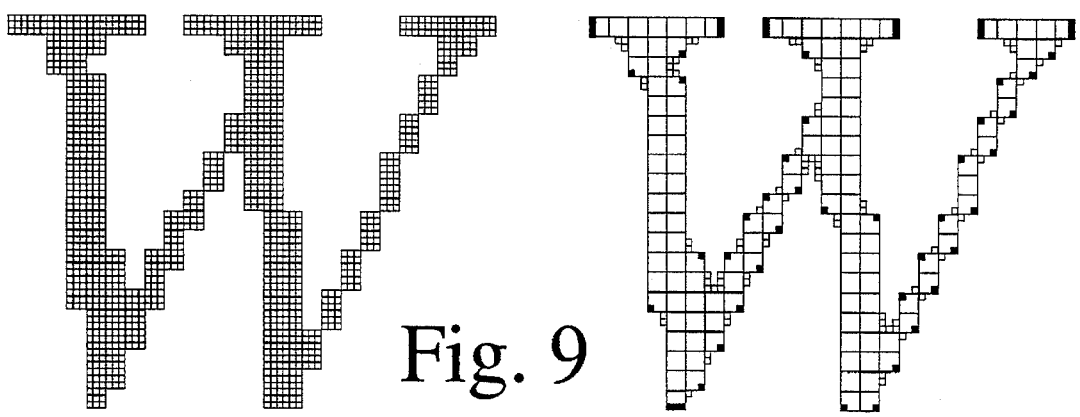
Fig. 9

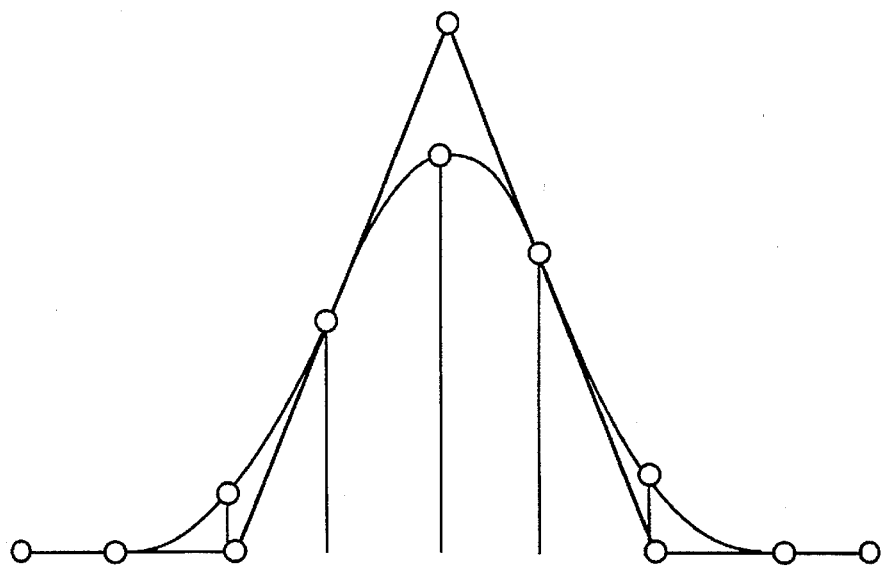
Fig. 22
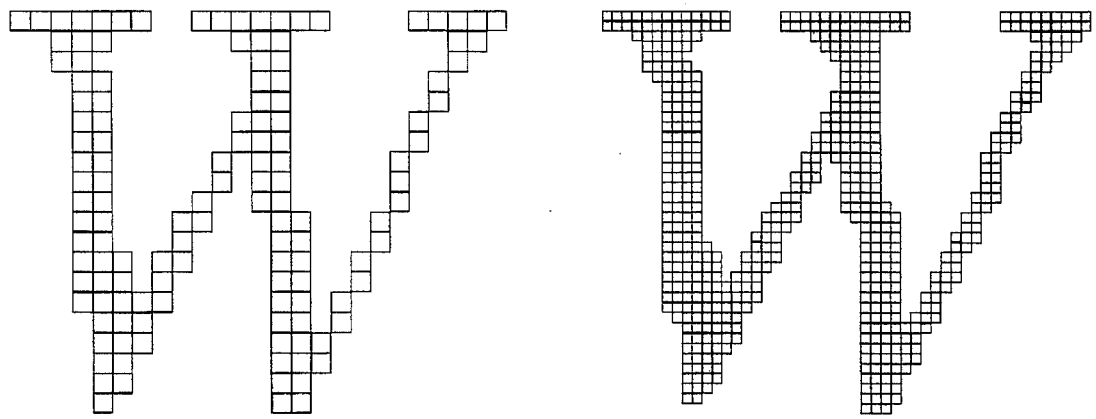
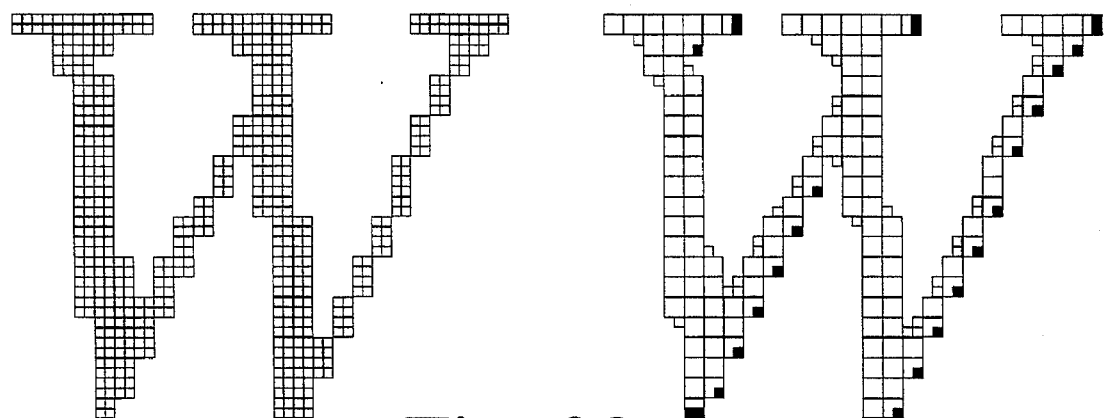
Fig. 23

In facsimile a photocell is
the subject copy. The variation
cause the photocell to generate
This signal is used to modulate
remote destination over a radio

Fig. 28

In facsimile a photocell is
the subject copy. The variation
cause the photocell to generate
This signal is used to modulate
remote destination over a radio

Fig. 29

In facsimile a photocell is
the subject copy. The variation
cause the photocell to generate
This signal is used to modulate
remote destination over a radio

Fig. 31

```
    In facsimile a photocell is
the subject copy.  The variation
cause the photocell to generate
This signal is used to modulate
remote destination over a radio
```

BINARY IMAGE SCALING BY PIECEWISE POLYNOMIAL INTERPOLATION

BACKGROUND OF THE INVENTION

1. Technical Field

The present invention relates to scaling binary images. More particularly, the present invention relates to binary image scaling by piecewise polynomial interpolation.

2. Description of the Prior Art

When scaling a binary image, it is necessary to resolve the discrepancy between the input resolution and the output resolution. For example, in facsimile imaging the original images are transmitted at a standard resolution, typically 203 dots per inch ("dpi") in the row direction and 98 dpi in the column direction, and printed at the printer resolution, e.g. 300 dpi, in both the row and column directions. Another example of binary imaging involves font scaling, for example when a 12 point font at 300 dpi is to be used as a 24 point font and printed on a 600 dpi printer, the original image must be scaled by a factor of four. Thus, the scaling factor can be an integer or a fractional number.

One approach to image scaling is to apply piecewise polynomial interpolation such as B-splines, as proposed in R. V. Klassen, R. H. Bartels, *Using B-splines for Re-Sizing Images*, University of Waterloo, Department of Computer Science, Technical Report, 1986. However, such approach has not proven satisfactory.

A quantization error problem embedded in all piecewise polynomial interpolants for scaling was reported in I. E. Abdou and K. Y. Wong, *Analysis of Linear Interpolation Schemes for Bi-Level Image Applications*, IBM J. Res. Develop., V. 26, No. 6, pp. 667–680, November, 1982. Thus, interpolation schemes give rise to a quantization error problem, such that the image stroke width is not preserved after image scaling.

Other known approaches for scaling and smoothing images include pixel-replication, contour-tracing (see W. Rutkowski, *Shape Completion*, Computer Graphics and Image Processing, Vol. 9, pp. 89–101, 1979), cubic B-spline interpolation (see H. S. Hou, H. C. Andrews, *Cubic Splines for Image Interpolation and Digital Filtering*, IEEE Transaction on Acoustic, Speech and Signal Processing, Vol. ASSP-26, pp. 508–517), template based scaling (see R. A. Ulichney, D. E. Troxel, *Scaling Binary Images with the Telescoping Template*, IEEE Transactions on Pattern Analysis and Machine Intelligence, Vol. PAMI-4, No. 3, pp. 331–335, 1982), and extrapolative prediction (see C. Tung, *Resolution Enhancement Technology in Hewlett Packard Laser Jet Printers*, IST/SPIE Symposium on Electronic Imaging: Science and Technology, pp. 440–448, 1993).

There is not known a satisfactory and flexible scheme based on automatic numerical computation for binary image scaling that is general enough for all integer and fractional scaling factors, while avoiding quantization problems typically encountered in prior art approaches using piecewise polynomial interpolants.

SUMMARY OF THE INVENTION

The exemplary embodiment of the invention is based on a piecewise polynomial interpolation scheme. The scheme views images as three-dimensional data in which the X and Y coordinates are the input image dimensions, and the Z coordinate, i.e. the height field, is the intensity of the original image. The three-dimensional data set is fitted by a surface. A resampling process on this fitting surface provides interpolative data. A thresholding process applied on these interpolative data produces an output, i.e. a final binary image. Based on the interpolation scheme, each output pixel is a result of blending its neighboring input pixels, i.e. it is a weighted average, with weights determined by the type of the interpolant, its degree, and the scaling factor. For fixed scaling factors, the weights can be pre-calculated, and the convolution can be accomplished by table lookup.

BRIEF DESCRIPTION OF THE DRAWINGS

FIG. 8 shows a bi-quadratic interpolation of the test character of FIG. 2;

FIG. 9 shows a bi-cubic interpolation of the test character of FIG. 2;

FIG. 22 shows the impulse response of a quadratic Beta-spline;

FIG. 23 shows an image that results from interpolating by a bi-quadratic Beta-spline;

FIG. 28 shows a portion of a Slerexe letter in standard resolution;

FIG. 29 shows a portion of a Slerexe letter in fine resolution;

FIG. 31 shows an image that results from applying a bi-cubic B-spline surface as an interpolant for scaling horizontally and vertically by a factor of 3.0 in fine resolution;

DETAILED DESCRIPTION OF THE INVENTION

The exemplary embodiment of the invention is based on a piecewise polynomial interpolation scheme (see J. Yen, *Binary Image Scaling by Piecewise Polynomial Interpolation*, HPL Technical Report, March, 1994). The invention applies a surface based approach to image scaling, as opposed to prior art contour-tracing schemes.

Image scaling in accordance with the invention herein is not limited to cubic transforms, as described in H. S. Hou, H. C. Andrews, *Cubic Splines for Image Interpolation and Digital Filtering*, IEEE Transaction on Acoustic, Speech and Signal Processing, Vol. ASSP-26, pp. 508–517. However, the exemplary embodiment of the invention does share some features with the template based approaches of R. A. Ulichney, D. E. Troxel, *Scaling Binary Images with the Telescoping Template*, IEEE Transactions on Pattern Analysis and Machine Intelligence, Vol. PAMI-4, No. 3, pp. 331–335, 1982; and C. Tung, *Resolution Enhancement Technology in Hewlett Packard LaserJet Printers*, IST/SPIE Symposium on Electronic Imaging: Science and Technology, pp. 440–448, 1993. Although the invention differs from such prior art approaches because it derives templates mathematically from surface geometry rather than by interpretation or extrapolation by analysis of each individual case. Therefore the templates herein may be numerically fine-tuned for print quality control, as may be required, or as are consistent with, various selected design parameters.

Figure 1:
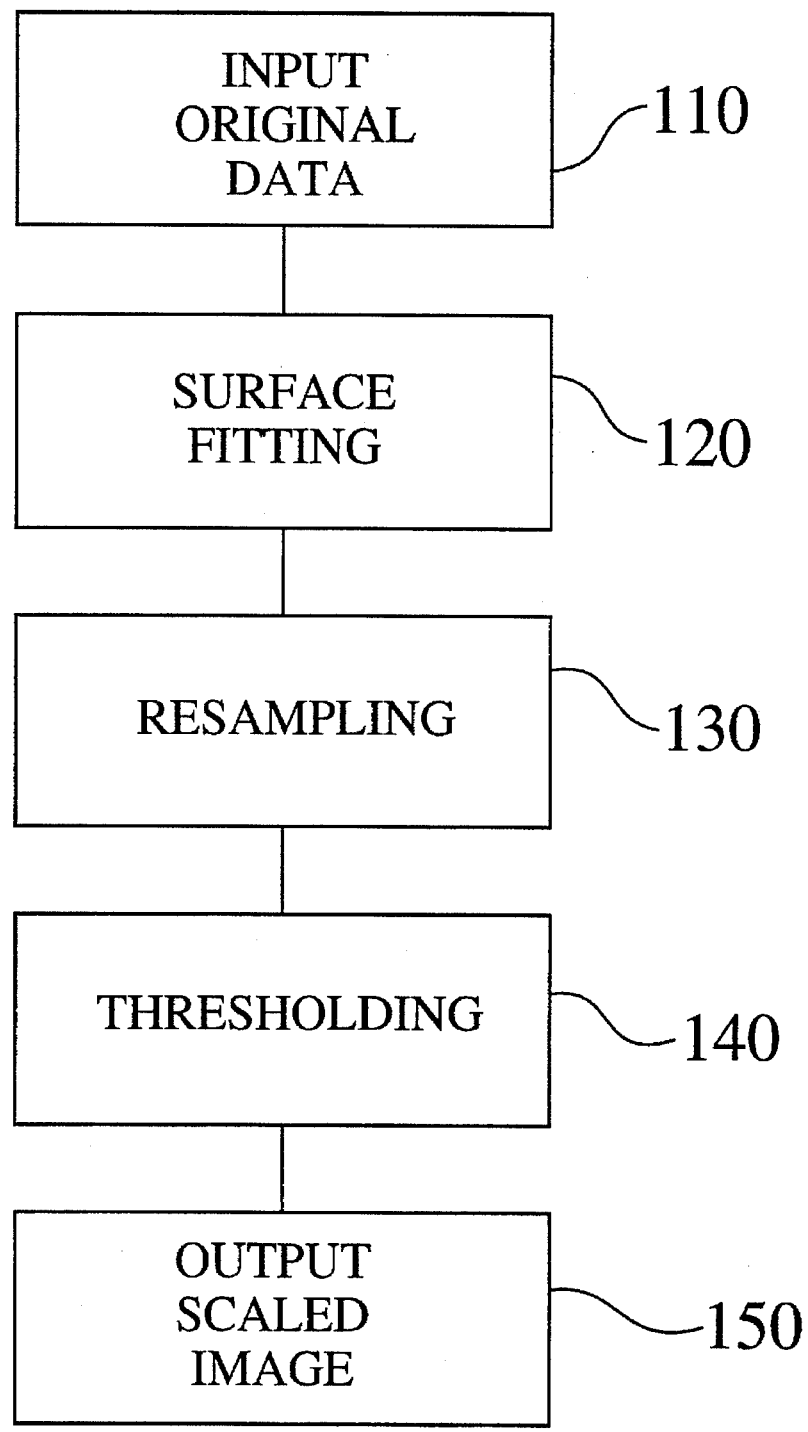
FIG. 1 is a flow diagram showing a process path for an exemplary embodiment of the invention.

FIG. 1 is a flow diagram showing a process path for an exemplary embodiment of the invention. The invention provides a scheme that treats binary images as three-dimensional data in which the X and Y coordinates are the input image (110) dimensions, and the Z coordinate, i.e. the height field, is the intensity of the original image. This three-dimensional data set is fitted by a surface (120). A resampling process (130) on the fitting surface provides interpolative data. A thresholding process (140) is applied to the interpolative data to produce an output binary image (150). Based on this interpolation scheme, each output pixel is a result of blending its neighboring input pixels, i.e. each output pixel is a weighted average of its neighboring pixels, with weights determined by the type of the interpolant, its degree, and the desired scaling factor. In one embodiment of the invention, the weights can be pre-calculated for fixed scaling factors, such that the convolution can be accomplished by table lookup.

An Interpolation Method.

The exemplary embodiment of the invention provides a scheme that employs a piecewise polynomial, for example, B-splines, as the fitting interpolant to the original data (see W. J. Gordon and R. F. Riesenfeld, *B-spline Curves and Surfaces* in R. E. Barnhill and R. F. Riesenfeld (eds.), Computer Aided Geometric Design, Academic Press, New York, 1974, pp. 95–126).

A Curve $$\gamma(t) = \sum_{i=0}^{k-1} B_{i,k}(t) p_i \qquad (1)$$

is a uniform polynomial B-spline curve in parameter $t \in (0,1)$, where $B_{i,k}(t)$ are the spline basis, of order k (degree k–1), and $p_i$ are the input coefficients. In product form, $$\gamma(t) = BP \qquad (2)$$

where $$B = [B_{0,k}(t) \; B_{1,k}(t) \ldots B_{k-1,k}(t)] \qquad (3)$$

and $$P = [p_0 \; p_1 \ldots p_{k-1}]^T. \qquad (4)$$

EXAMPLE 1

A cubic uniform polynomial B-spline curve, $$\gamma(t) = [B_{0,4}(t) \; B_{1,4}(t) \; B_{2,4}(t) \; B_{3,4}(t)][p_0 \; p_1 \; p_2 \; p_3]^T, \qquad (5)$$

is an inner product of four input coefficients $p_i$'s and the cubic spline basis $B_{i,4}(t)$'s evaluated at t between [0, 1).

Marsden's Identity

It can be proven (see L. Schumaker, *Spline Functions: Basic Theory*, Wiley, New York, 1981) that for each spline basis of order k, $$B = [B_{0,k}(t) \; B_{1,k}(t) \ldots B_{k-1}(t)] \qquad (6)$$

there exists a basis translation matrix (k by k) $M_k$, such that $$B = TM_k \qquad (7)$$

where $T_k$ is the power basis, $$[t^{k-1} \; t^{k-2} \ldots t \; 1]. \qquad (8)$$

Since $\gamma(t) = BP$, therefore, $$\gamma(t) = TM_k P. \qquad (9)$$

EXAMPLE 2

Given input coefficients, $p_0$, $p_1$, $p_2$, and $p_3$, a cubic uniform polynomial B-spline curve t is defined as $$\gamma(t) = [t^3 \; t^2 \; t \; 1] M_4 [p_0 \; p_1 \; p_2 \; p_3], t \in [0,1) \qquad (10)$$

where the basis translation matrix is $$M_4 = \begin{bmatrix} -\frac{1}{6} & \frac{1}{2} & -\frac{1}{2} & \frac{1}{6} \\ \frac{1}{2} & -1 & \frac{1}{2} & 0 \\ -\frac{1}{2} & 0 & \frac{1}{2} & 0 \\ \frac{1}{6} & \frac{2}{3} & \frac{1}{6} & 0 \end{bmatrix} \quad (11)$$

(see J. D. Foley, A. van Dam, S. K. Feiner, J. F. Hughes, *Computer Graphics, Principles and Practice*, Second Edition, Addison Wesley, 1990).

The basis translation matrices for other degrees, from linear through septimal, are described below. For more than k order input coefficients, every k consecutive coefficients define one piece of the curve segment such that the total curve consists of these curve segments and is thus called a piecewise B-spline curve. For a piecewise uniform polynomial B-spline curve, all the curve segments are connected smoothly, i.e. with $C^{k-1}$ continuity at segment joints.

A surface $$s(u,v) = \sum_{i=0}^{k_u-1} \sum_{j=0}^{k_v-1} B_{i,k_u} A_{j,k_v}(v) p_{i,j} \quad (12)$$

is a uniform polynomial B-spline tensor product surface in parameters $u \in [0,1)$ and $v \in [0,1)$, where:

B's are the spline basis, of order $k_u$ in direction U;
A's are the spline basis, of order $k_v$ in direction V; and
$p_{i,j}$'s are the two-dimensional input coefficients.

Thus, $s(u,v) = BPA^T$, similar to the curve case, $A = UM_{k_u}$, $A = VM_{k_v}$, and $A^T = M_{k_v}^T V^T$ where U is the power basis in u; V is the power basis in v; and M's are the basis translation matrices.

Therefore, $$s(u,v) = UM_{k_u} P M_{k_v}^T V^T. \quad (13)$$

EXAMPLE 3

A bi-cubic uniform polynomial B-spline tensor product surface $$s(u,v) = UM_4 P M_4^T V^T \quad (14)$$

where $M_4$ is the basis translation matrix of order 4, as shown above in Example 2.

EXAMPLE 4

Figure 2:
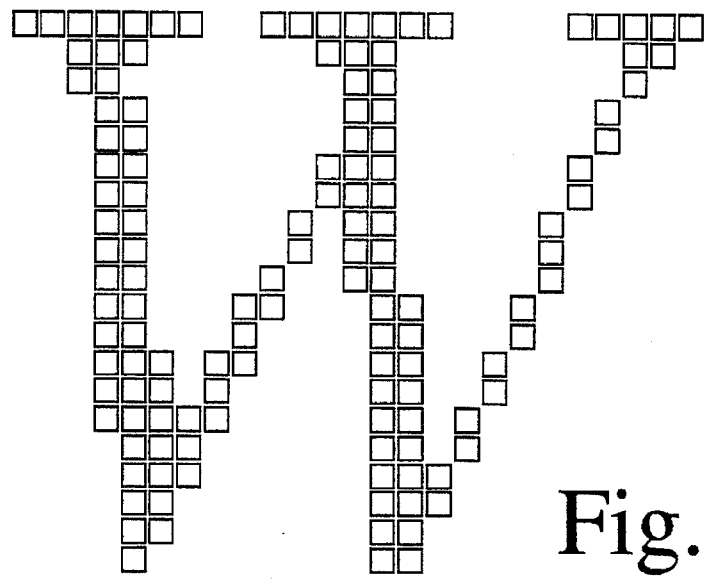
FIG. 2 shows a test character in 20 point, 300 dpi, Times Font.
Figure 3:
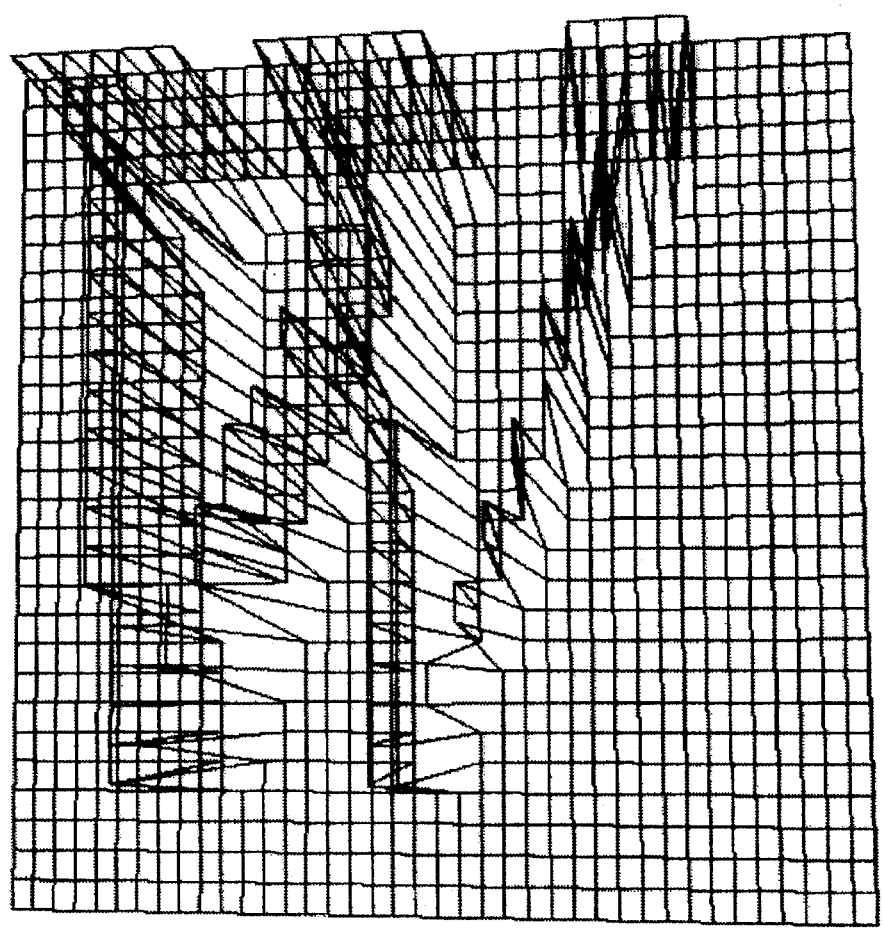
FIG. 3 is a wireframe representation of the input coefficients for the test character of FIG. 2.

FIG. 2 shows a test character in 20 point, 300 dpi, Times Font. FIG. 3 is a wireframe representation of the input coefficients for the test character of FIG. 2.

Figure 4:
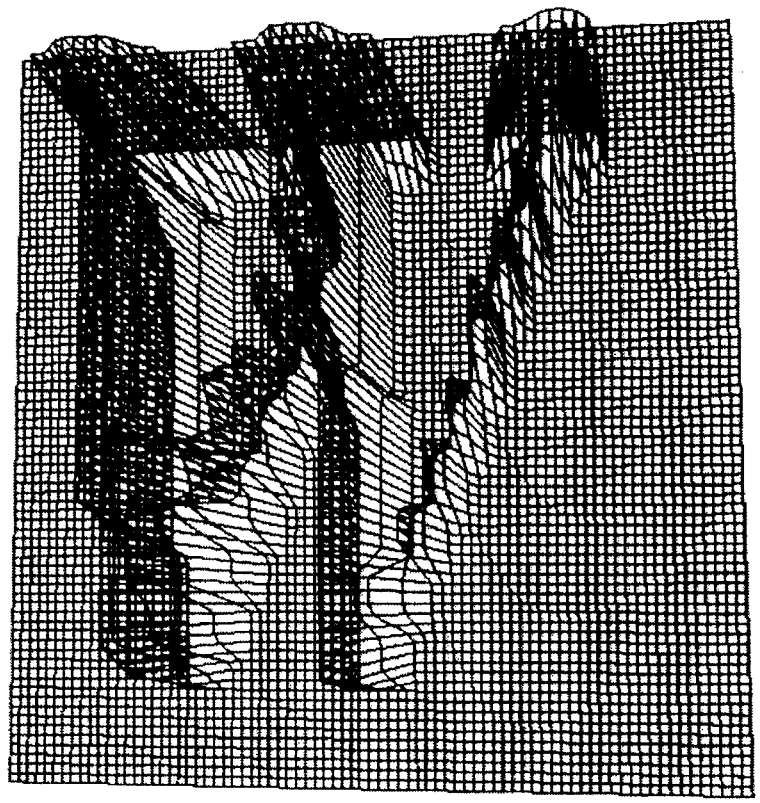
FIG. 4 shows a bi-linear tensor product B-spline surface defined by the input data of the test character of FIG. 2.
Figure 5:
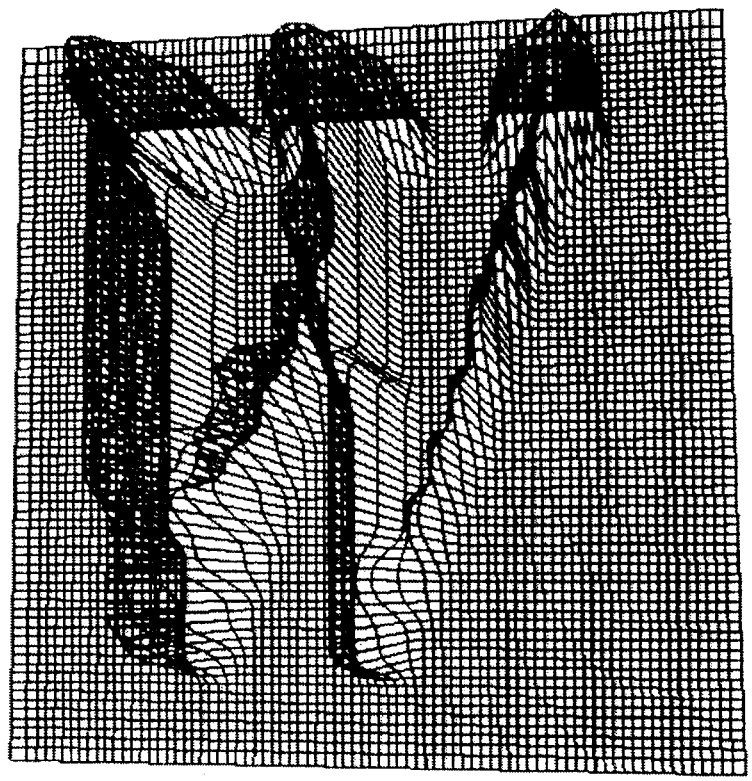
FIG. 5 shows a bi-quadratic tensor product B-spline surface defined by the input data of the test character of FIG. 2.
Figure 6:
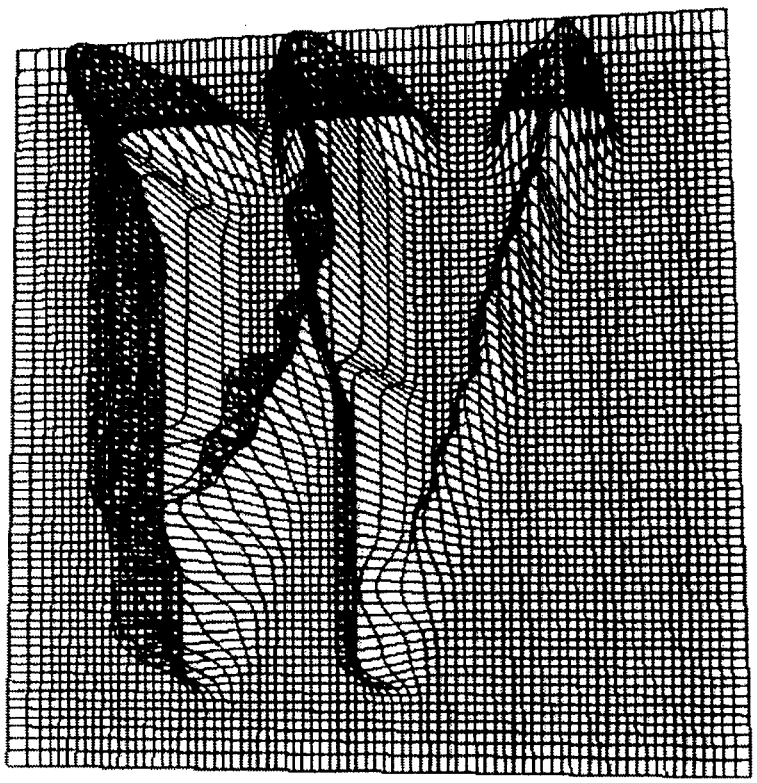
FIG. 6 shows a bi-cubic tensor product B-spline surface defined by the input data of the test character of FIG. 2.

FIG. 4 shows a bi-linear tensor product B-spline surface defined by the input data of the test character of FIG. 2; FIG. 5 shows a bi-quadratic tensor product B-spline surface defined by the input data of the test character of FIG. 2; and FIG. 6 shows a bi-cubic tensor product B-spline surface defined by the input data of the test character of FIG. 2.

Figure 7:
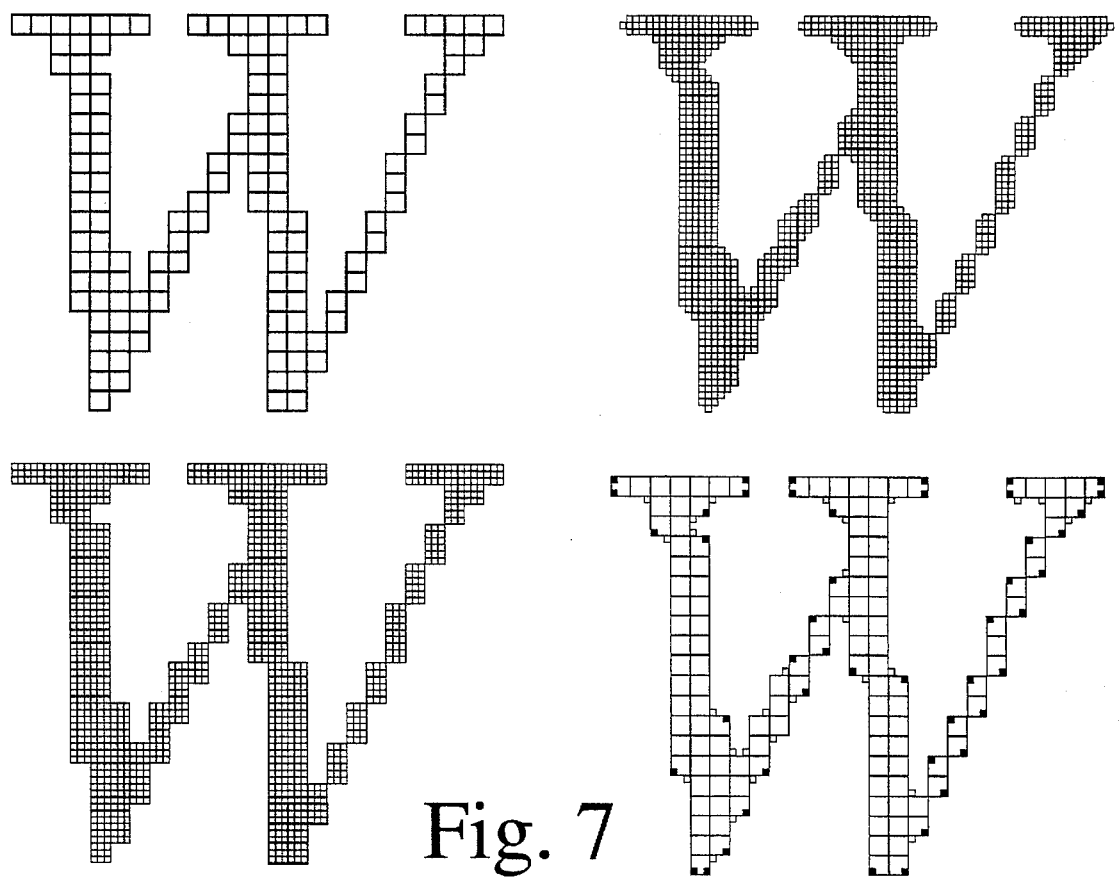
FIG. 7 shows a bi-linear interpolation of the test character of FIG. 2.

FIG. 7 shows a bi-linear interpolation of the test character of FIG. 2; FIG. 8 shows a bi-quadratic interpolation of the test character of FIG. 2; and FIG. 9 shows a bi-cubic interpolation of the test character of FIG. 2. In each of the foregoing figures, The letter "W" is shown as a series of steps in which the lower right hand letter includes missing portions of the letter after scaling, indicated by small solid squares, and added portions of the letter after scaling, indicated by small hollow squares. Notice that the result of bi-linear interpolation appears to be blocky, while the results of higher order interpolation are usually smoother.

B-splines as Convolution Kernels

Once the order of the interpolating surface is determined, the resampling process on the fitting surface evaluates the piecewise polynomial surface at a set of appropriate locations, one piece at a time.

For scaling by a factor of M in the U direction, the evaluation locations are selected between [0,1) with even spacing, usually $0, \frac{1}{M}, \frac{2}{M}, \ldots,$ $$\frac{M-1}{M}$$

in the U direction.

For scaling by a factor of N in the V direction, the evaluation locations are selected between [0,1) with even spacing, usually $0, \frac{1}{N}, \frac{2}{N}, \ldots,$ $$\frac{M-1}{N}$$

in the V direction.

Since each piece of the surface is defined by the $k_u$ by $k_v$ consecutive input coefficients, resampling involves evaluating $$s(u,v) = UM_4 PM_4^T V^T; \quad (15)$$

$$u = 0, \frac{1}{M}, \frac{2}{M}, \ldots \frac{M-1}{M};$$

$$v = 0, \frac{1}{N}, \frac{2}{n}, \ldots \frac{N-1}{N}.$$

For each known $(u_0, v_0)$ pair, $UM_{k_u}$ and $M_{k_v}^T V^T$ can be pre-calculated as vectors, $\xi$ and $\emptyset$, respectively. A $k_u$ by $k_v$ matrix, called the Kernel Matrix, can be constructed by multiplying $\xi$ and $\emptyset$, i.e.

$$K_{ij} = \xi_i \emptyset_j. \quad (16)$$

The coefficient matrix P is also $k_u$ by $k_v$. The sum of the entry-by-entry product of P and K is the result of the surface evaluated at $u_0$ and $v_0$, $$s(u_0, v_0) = \sum_{(i,j)} P_{ij} K_{ij}. \quad (17)$$

The kernel matrix is constructed for each (u,v) pair.

Finally, a threshold value is selected to compare against the numeric values, $s(u,v)$'s, to obtain the binary data of the output pixels.

EXAMPLE 5

To scale an image by a factor of 3 with a bi-cubic uniform piecewise B-spline tensor product surface, $s(u,v)$, for each 4 by 4 input pixels, e.g.

$$\begin{bmatrix} 0 & 1 & 1 & 0 \\ 0 & 0 & 1 & 0 \\ 0 & 1 & 1 & 0 \\ 0 & 1 & 1 & 1 \end{bmatrix}, \quad (18)$$

a kernel matrix is calculated for each of the following 3 by 3 output pixels:

$$\begin{bmatrix} s(0,0) & s\left(0,\frac{1}{3}\right) & s\left(0,\frac{2}{3}\right) \\ s\left(\frac{1}{3},0\right) & s\left(\frac{1}{3},\frac{1}{3}\right) & s\left(\frac{1}{3},\frac{2}{3}\right) \\ s\left(\frac{2}{3},0\right) & s\left(\frac{2}{3},\frac{1}{3}\right) & s\left(\frac{2}{3},\frac{2}{3}\right) \end{bmatrix} \quad (19)$$

For instance, for the upper left corner of the 9 output pixels, $s(u_0,v_0)$, where $u_0=0.0$ and $v_0=0.0$, $U=[u^3\ u^2\ u\ 1.0]= [0.0\ 0.0\ 0.0\ 1.0]$, and $$M = \begin{bmatrix} -\frac{1}{6} & \frac{1}{2} & -\frac{1}{2} & \frac{1}{6} \\ \frac{1}{2} & -1 & \frac{1}{2} & 0 \\ -\frac{1}{2} & 0 & \frac{1}{2} & 0 \\ \frac{1}{6} & \frac{2}{3} & \frac{1}{6} & 0 \end{bmatrix}. \quad (20)$$

Therefore, $$UM = \begin{bmatrix} \frac{1}{6} & \frac{2}{3} & \frac{1}{6} & 0 \end{bmatrix}. \quad (21)$$

Similarly, $$V_T = \begin{bmatrix} v^3 \\ v^2 \\ v \\ 1.0 \end{bmatrix} = \begin{bmatrix} 0.0 \\ 0.0 \\ 0.0 \\ 1.0 \end{bmatrix} \quad (22)$$

and $$M^T V^T = \begin{bmatrix} \frac{1}{6} \\ \frac{2}{3} \\ \frac{1}{6} \\ 0 \end{bmatrix}. \quad (23)$$

The kernel matrix for $s$ (0.0,0.0) can be calculated by multiplying entries of $(UM)$ with $(M^T V^T)$, i.e.

$$K^{0,0} = \frac{1}{36} \begin{bmatrix} 1 & 4 & 1 & 0 \\ 4 & 16 & 4 & 0 \\ 1 & 4 & 1 & 0 \\ 0 & 0 & 0 & 0 \end{bmatrix}. \quad (24)$$

Finally, the sum of the entry-to-entry product of P and K, $$s(0.0,0.0) = \sum_{(i,j)} P_{ij} K_{ij} = \frac{5}{18}, \quad (25)$$

is a numeric value representing the point on the surface after resampling. The final quantization step compares this numeric value against a pre-selected threshold value to produce a binary value representing the upper-left corner of the output binary image.

The kernels for the other $s(u,v)$'s are listed below.

B-spline Characteristics

There are many advantageous mathematical characteristics of B-splines. Some of the advantages of using B-splines as interpolants for binary image scaling are listed below:

Continuum. The fitting surface, i.e. a B-spline surface, is a continuum covering the entire input data. Accordingly, the resampling process always produces at least a few points on the surface, regardless of the arbitrariness of the scaling factors. Thus, this interpolating method is applicable for any arbitrary scaling factor.

Convex Hull Property. A B-spline tensor product surface is always contained in the convex hull formed by its input data mesh. Thus, all the output data produced from the resampling process are always bounded by the input data.

Continuity. A B-spline tensor product surface is $C^{k-1}$ continuous in each parametric direction, where k is the order. Thus, the interpolated data are smooth. If a higher order interpolant is used, the edges of the output image are smoother.

Locality. Each point on the B-spline tensor product surface depends only on a finite number of input data points, $k_u$ by $k_v$, where k's are the orders of the surface. Thus, the convolution kernel size of each output pixel is no more than $k_u$ by $k_v$.

Separability. The surface evaluation process of a B-spline tensor product surface may be totally independent from one parametric direction to the other. Accordingly, this interpolation scheme works for different scaling factors in the two orthogonal directions. In addition, the order of one direction is totally independent from the order of the other direction. Thus, the selection of the interpolant orders may be as arbitrary as required.

Symmetry. All the B-spline basic functions are symmetric and their impulse response functions are also symmetric.

Computational Complexity

The complexity of the scheme herein described is linear in the input size because it has a fixed number of operations per pixel. The scheme may be thought of as constant filtering with a set of $k_u$ by $k_v$ convolution kernels, where k's are the orders, i.e. degrees plus one, of the fitting surface. The number of the filters is at most M*N, where M and N are the scaling factors in the horizontal and vertical directions, respectively.

The filtering process of the scheme described herein depends only on the scaling factor, the orders of the fitting surface, and the threshold value. Therefore, after the filter parameters are finalized, a template scheme may easily be implemented by pattern matching and table lookup.

The lookup table size may be up to about $2^{k_u k_v}$ *M*N bits. However, much reduction in table size may be achieved by using the mathematical properties of B-splines. For example, when scaling by a factor of 3 with a bi-cubic uniform piecewise B-spline tensor product surface, the upper bound of the space complexity is $2^{4*4}*3*3$ bits. That is, for each of the 9 output pixels, there is a table of 16 entries, as described below.

Locality. Upon close examination, it can be seen that not all of the 9 output pixels have 16 entries. For example, the convolution kernels of many output pixels have all 0's for the rightmost column or the bottommost row. The complexity of the lookup tables can therefore be reduced to $2^9+2^{12}*4+2^{16}*4$ bits.

Symmetry. If one looks even more closely, one can also discover that there is some symmetry in the numeric values in the convolution kernels. For example, the kernels $$K^{0,\frac{1}{3}}, K^{0,\frac{2}{3}}, K^{\frac{1}{3},0}, K^{\frac{1}{3},0} \quad (26)$$

have similar rows or columns except the numbers are row-permutations or column-permutations of each other.

Similar relationships hold for $$K^{\frac{1}{3}}, -\frac{1}{3}, K^{\frac{1}{3}}, -\frac{2}{3}, K^{\frac{1}{3}}, -\frac{2}{3}, K^{\frac{1}{3}}, -\frac{2}{3}. \quad (27)$$

Thus, the space complexity of the lookup tables can be further reduced to $2^9 + 2^{12} + 2^{16}$ bits, if some processing capability is provided.

Dominancy. Some entries of the convolution kernels are more dominant with regard to the resulting output than are other entries. A final thresholding process is applied for binary image scaling. Many entries of the kernels become insignificant because of this quantization process. For example, if the threshold value is chosen as $16/32$ for the above case, then in kernel of s (0,0), those entries with value $1/36$ are effectively "don't-cares" because they never contribute to the final result in any significant way. For practical purposes, the various implementations of the invention may be optimized by keeping only the most dominant entries of kernels. In this way, one may fine tune the invention for each specific application by balancing between a practical table size and a desired print quality.

In summary, the lookup table size can be significantly reduced depending on the design constraints in memory limitation and processor speed.

A Quantization Error Problem

For scaling binary images, it is important to preserve the stroke width. That is, when a single pixel line is scaled by a factor of N, the output pixel line must have a width N. Sometimes the stroke width is not preserved if errors are produced from the quantization step of the scaling algorithm, for example when a single pixel line is scaled by a factor of 3 by means of a bi-quadratic B-spline interpolant.

Figure 10:
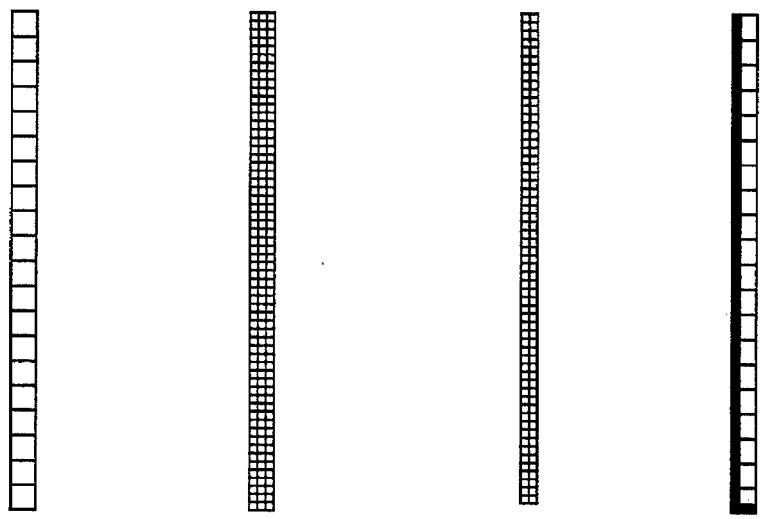
FIG. 10 shows an undershot quantization error.
Figure 11:
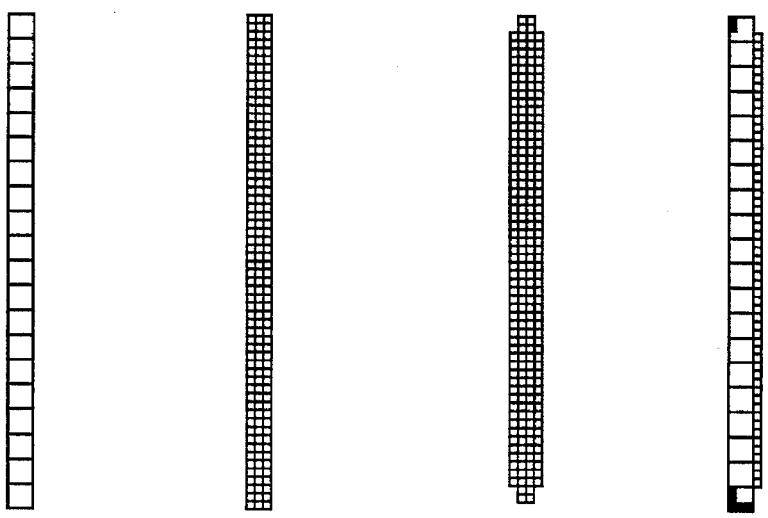
FIG. 11 shows an overshot quantization error.

FIG. 10 shows an undershot error in quantization with threshold value H=0.5; and FIG. 11 shows an overshot error in quantization with threshold value $H=0.5+1.0e^{-6}$. No matter how one adjusts the threshold value, the scaled image either consistently has an extra pixel line, or it has one less pixel line than the pixel replication. Similar errors occur when a single pixel line is to be scaled by a factor of 2 by means of a bi-cubic B-spline interpolant.

The quantization error problem was reported in I. E. Abdou and K. Y. Wong, *Analysis of Linear Interpolation Schemes for Bi-Level Image Applications*, IBM J. Res. Develop., V. 26, No. 6, pp. 667–680, November, 1982, and was believed to be caused by the lack of symmetry of all the even degree polynomials. However, as shown above, the quantization error occurs regardless of the degree of the interpolant.

Figure 12:
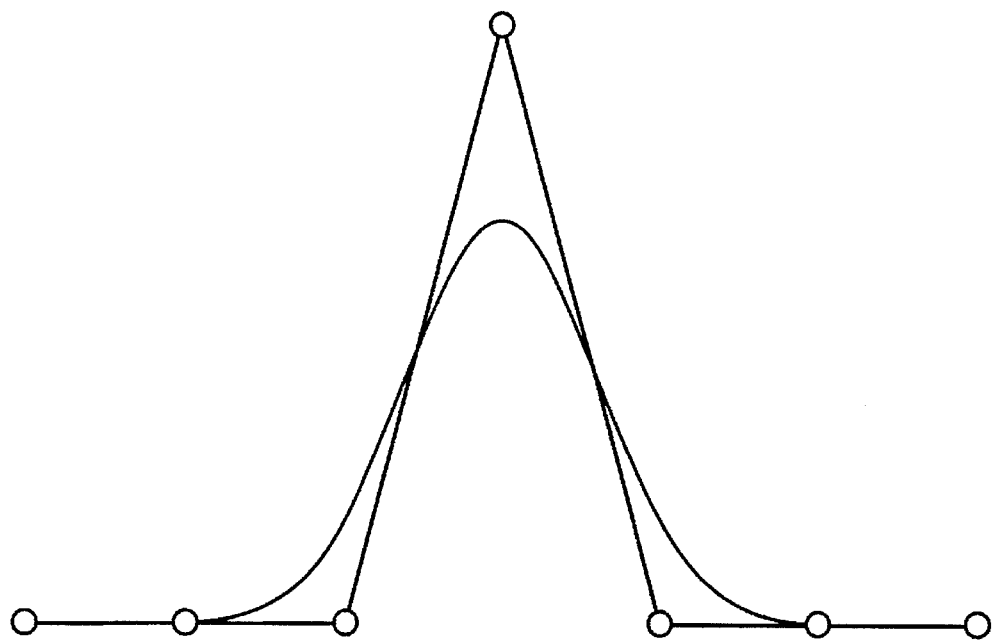
FIG. 12 shows the impulse response of a cubic B-spline.
Figure 13:
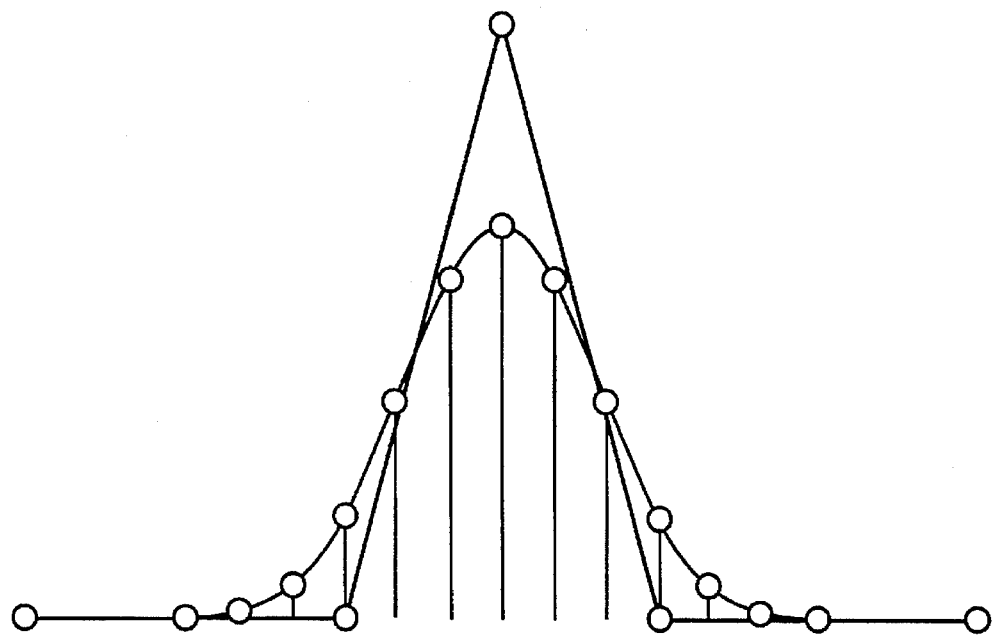
FIG. 13 shows the impulse response function of a cubic B-spline sampled at 0, ⅓, and ⅔.
Figure 14:
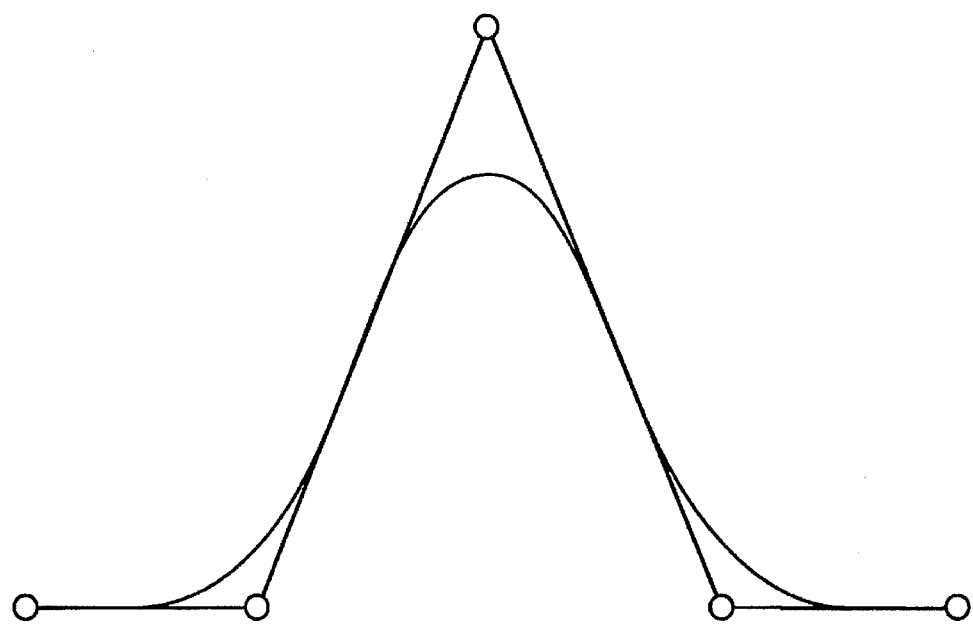
FIG. 14 shows the impulse response of a quadratic B-spline.
Figure 15:
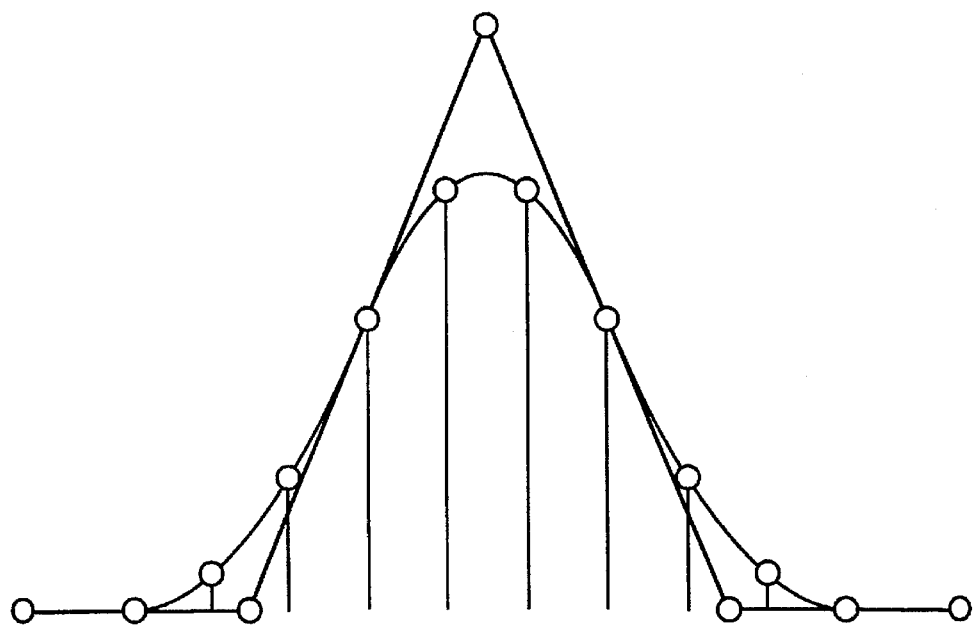
FIG. 15 shows the impulse response function of a quadratic B-spline sampled at 0, ⅓ and ⅔.

For example, FIG. 12 shows the impulse response of a cubic B-spline, while FIG. 13 shows the response function sampled at 0, $1/3$, and $2/3$. The peak of the response function, representing the input data point, is included in the resampled data. In contrast thereto (see FIGS. 14 and 15), when scaling by 3 with a quadratic B-spline interpolant, the peak of the response function is not included in the resampled data. This results because of sampling the interpolant at the locations, $0, 1/N, \ldots$, $$\frac{N-1}{N}.$$

This phenomenon has been described as the phase distortion property of all the even degree polynomials (see I. E. Abdou and K. Y. Wong, *Analysis of Linear Interpolation Schemes for Bi-Level Image Applications*, IBM J. Res. Develop., V. 26, No. 6, pp. 667–680, November, 1982).

Figure 16:
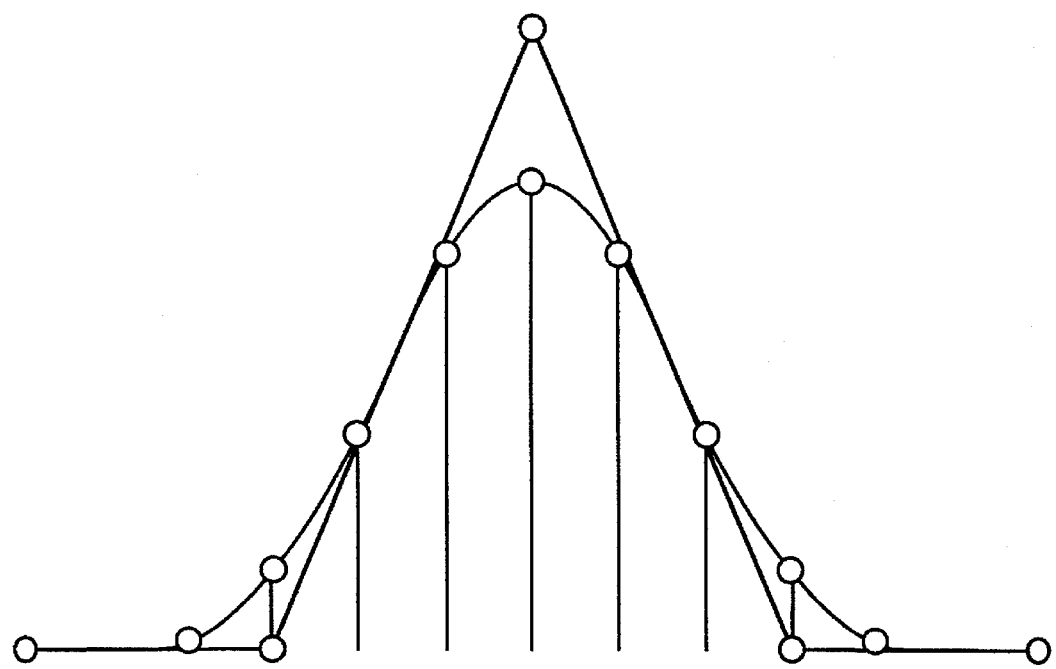
FIG. 16 shows a phase shift by one half of the spacing during sampling to compensate for phase distortion.
Figure 17:
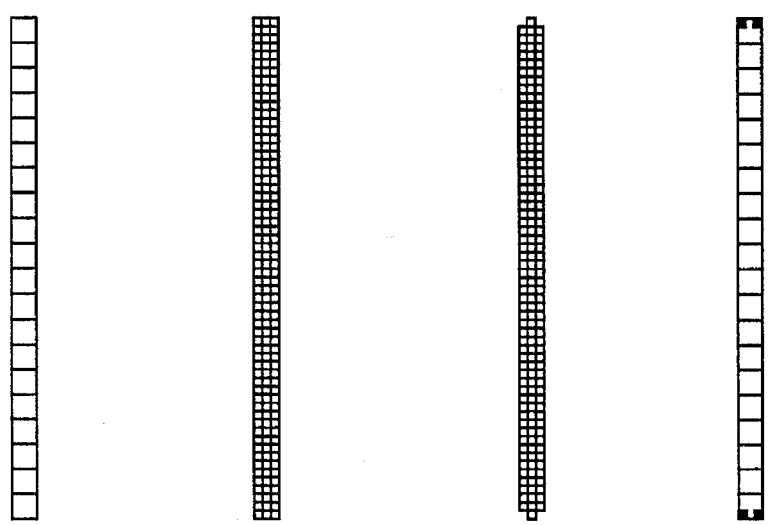
FIG. 17 shows an image that results from the phase shift of FIG. 16.

As shown in FIG. 16, the phase could be shifted by one half of the sampling spacing, e.g. by $1/6$, to compensate for such phase distortion. FIG. 17 shows the result of such an adjustment, having a threshold value H=0.56. It can be seen that for odd scaling factors, when compared to the situations shown in FIGS. 10 and 11, B-spline interpolants, whether of even degree or of odd degree, do not suffer quantization errors if the phase is not distorted.

Figure 18:
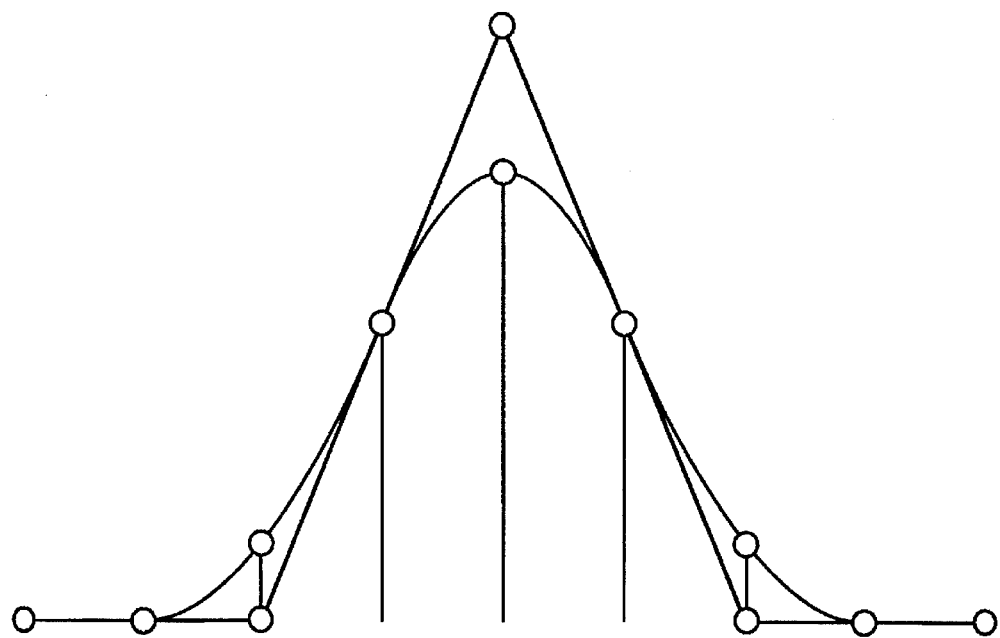
FIG. 18 shows the impulse response of a quadratic B-spline interpolant after sampling at 0 and ½.
Figure 19:
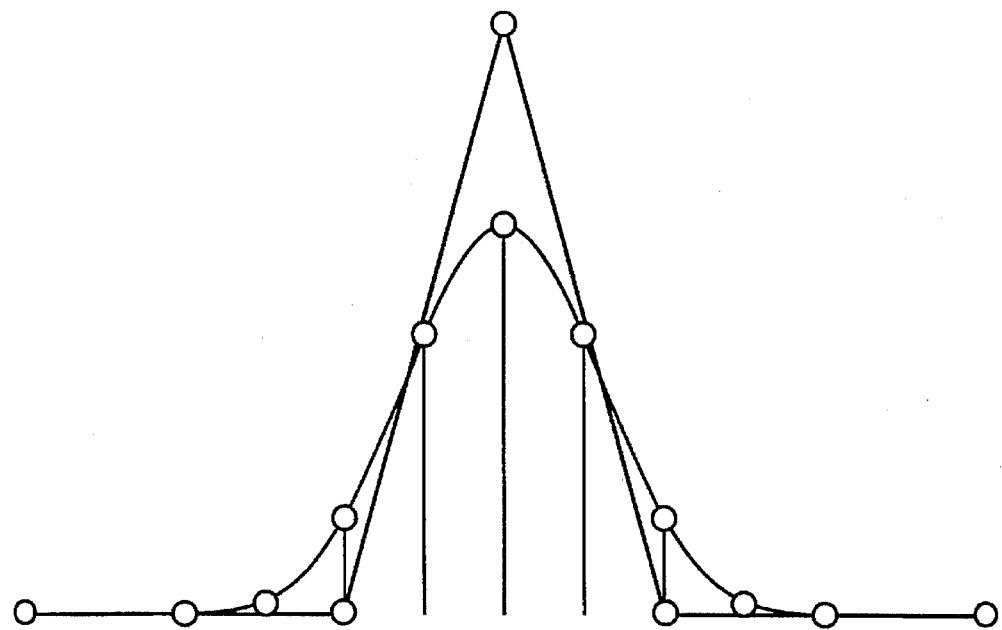
FIG. 19 shows the impulse response of a cubic B-spline interpolant after sampling at 0 and ½.
Figure 20:
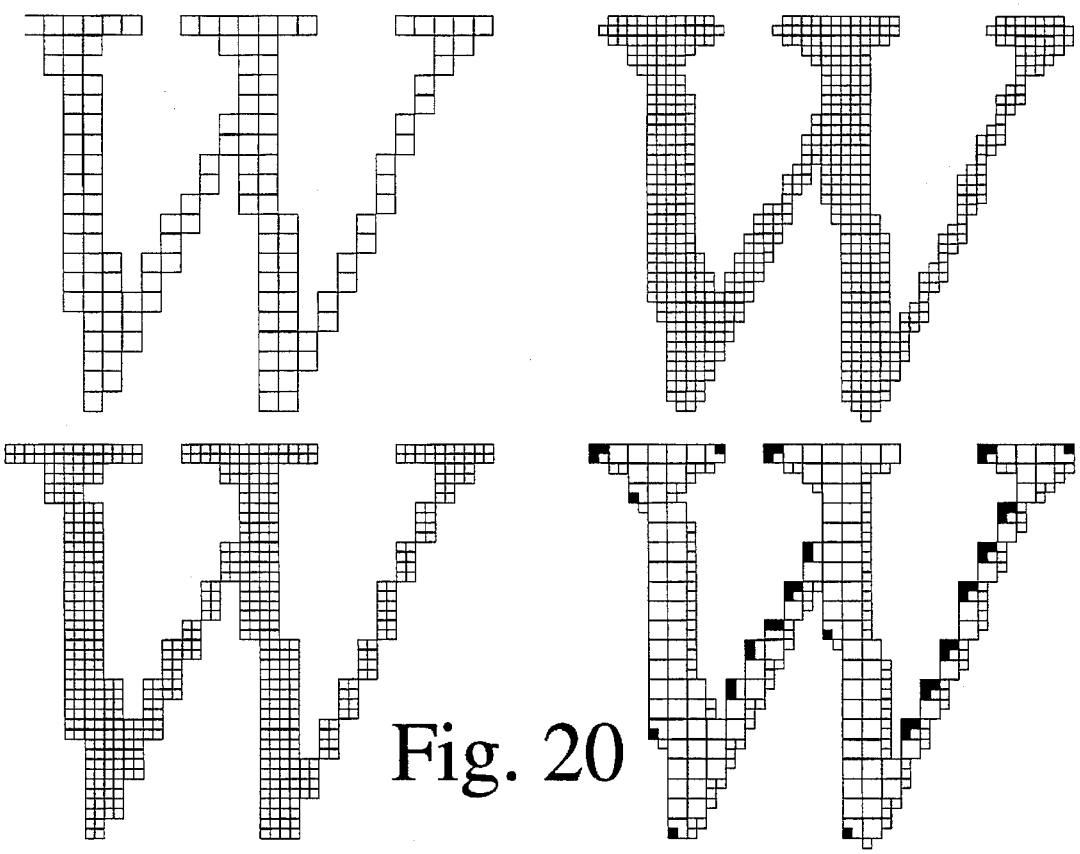
FIG. 20 shows quantization error for a bi-quadratic B-spline interpolant after sampling at 0 and ½, as shown in FIG. 18.
Figure 21:
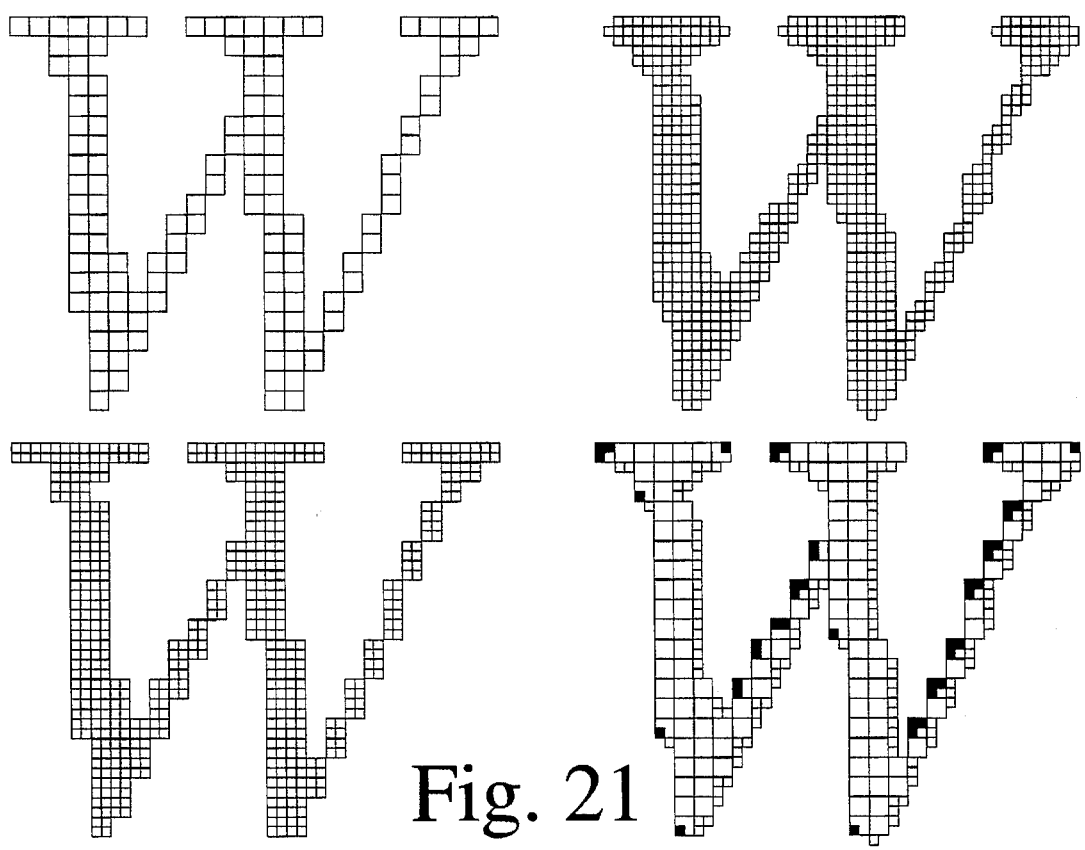
FIG. 21 shows quantization error for a bi-cubic B-spline interpolant after sampling at 0 and ½, as shown in FIG. 19.

However, for even scaling factors, all B-spline interpolants, regardless of whether they are of even degree or of odd degree, are subject to a quantization error, even if phase is not distorted. For example, FIG. 18 shows the impulse response of a quadratic B-spline interpolant after sampled at 0 and $1/2$, i.e. a scaling factor of 2; and FIG. 19 shows the impulse response of a cubic B-spline interpolant after sampled at 0 and $1/2$. In both cases, there is no phase distortion. Nevertheless, quantization errors occur in both cases, as shown in FIGS. 20 and 21. This quantization error is caused by a lack of symmetry of the interpolant. That is, in the absence of phase distortion, the peak of the impulse response is always sampled, while the rest of the sampled data points are always symmetric. Hence, when the thresholding step takes place, the result always contains an odd number of output pixels.

One aspect of the invention solves the quantization error problem caused by a lack of the symmetry of the impulse response of B-spline interpolant when even scaling factors are applied. In one embodiment of the invention, one aspect of this solution enlarges the search space from the space spanned by B-splines, which is equivalent to the space containing all the piecewise polynomials, to the space spanned by the Beta-spline, which is a more generalized form of splines (see A. Lempel and G. Seroussi, *Systematic derivation of spline bases*, Computer Aided Geometric Design, 9 (1992), pp. 349–363; and G. Seroussi and B. Barsky, *An explicit derivation of discretely shaped Beta-spline basis functions of arbitrary order*, Mathematical Methods in Computer Aided Geometric Design II, T. Lyche and Larry Schumaker (eds.), pp. 567–584, 1992).

Figure 24:
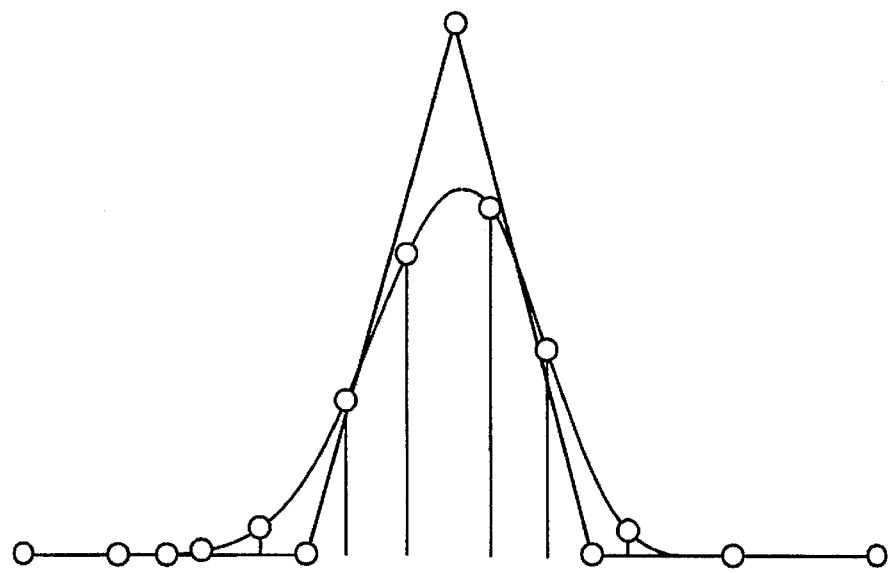
FIG. 24 shows the impulse response of a cubic Beta-spline.
Figure 25:
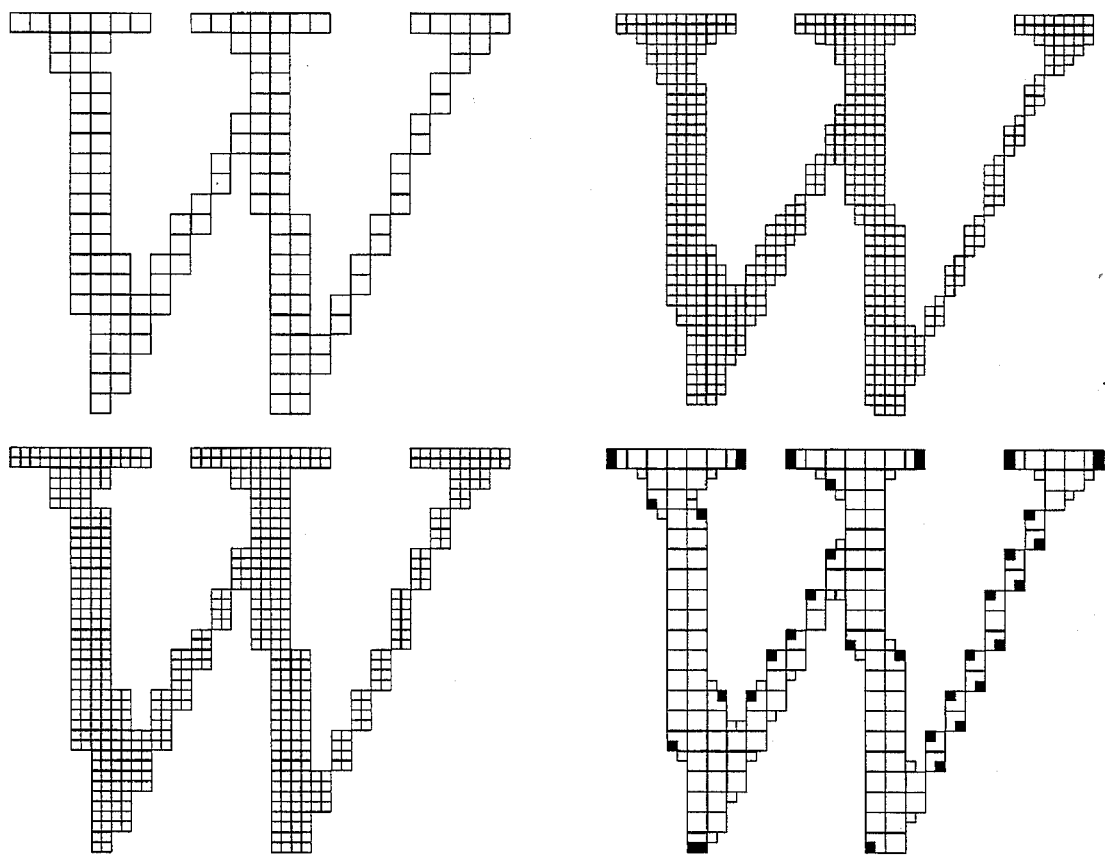
FIG. 25 shows an image that results from interpolating by a bi-cubic Beta-spline.

The use of enlarged search space is derived in part from the fact that the impulse response of a Beta-spline is usually not symmetric. FIG. 22 shows the impulse response of a quadratic Beta-spline with $\beta_1=1.3$, and FIG. 23 shows the result of using this interpolant with threshold value H=0.56; while FIG. 24 shows the impulse response of a cubic Beta-spline with $\beta_1=2.0$, $\beta_2=-0.5$, and FIG. 25 shows the result of using this interpolant with the threshold value H=0.52. Unfortunately, the foregoing solutions to the quantization error problem still produce a scaled output image that is missing at least one pixel in horizontal run length.

Figure 26:
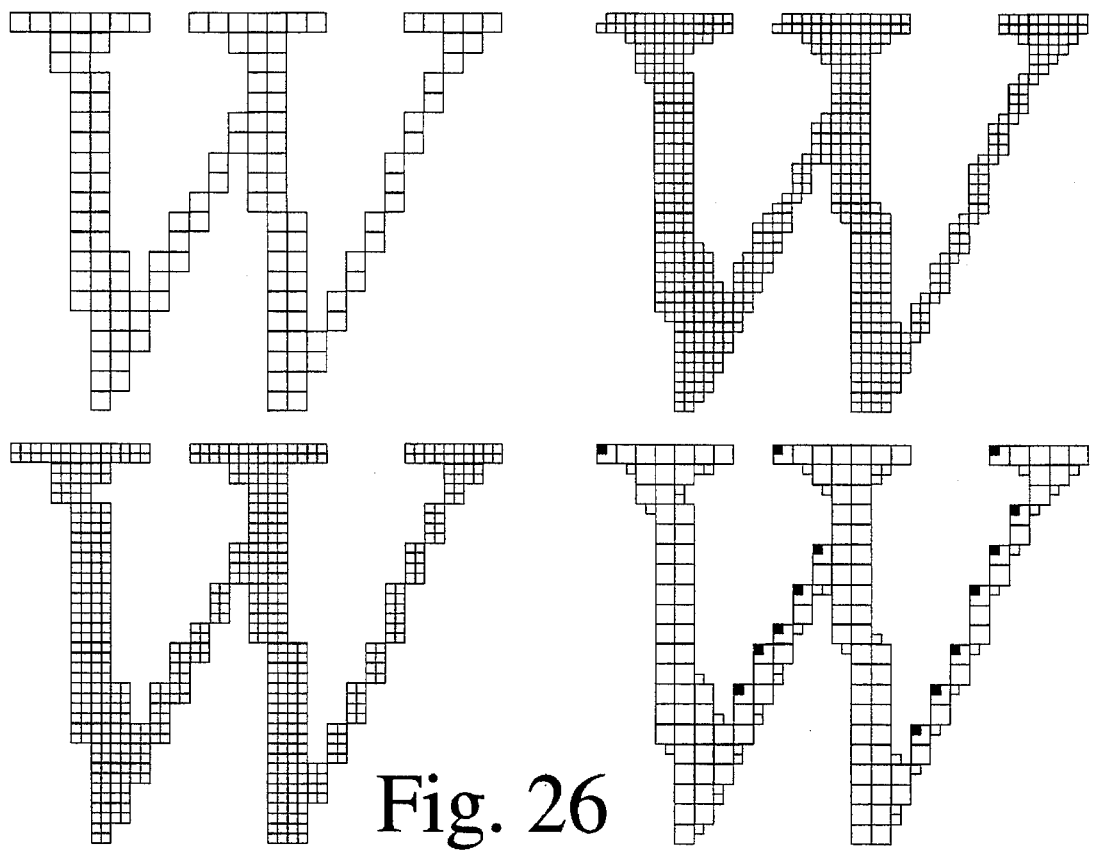
FIG. 26 shows an image that results from interpolating by a shifted bi-quadratic B-spline.
Figure 27:
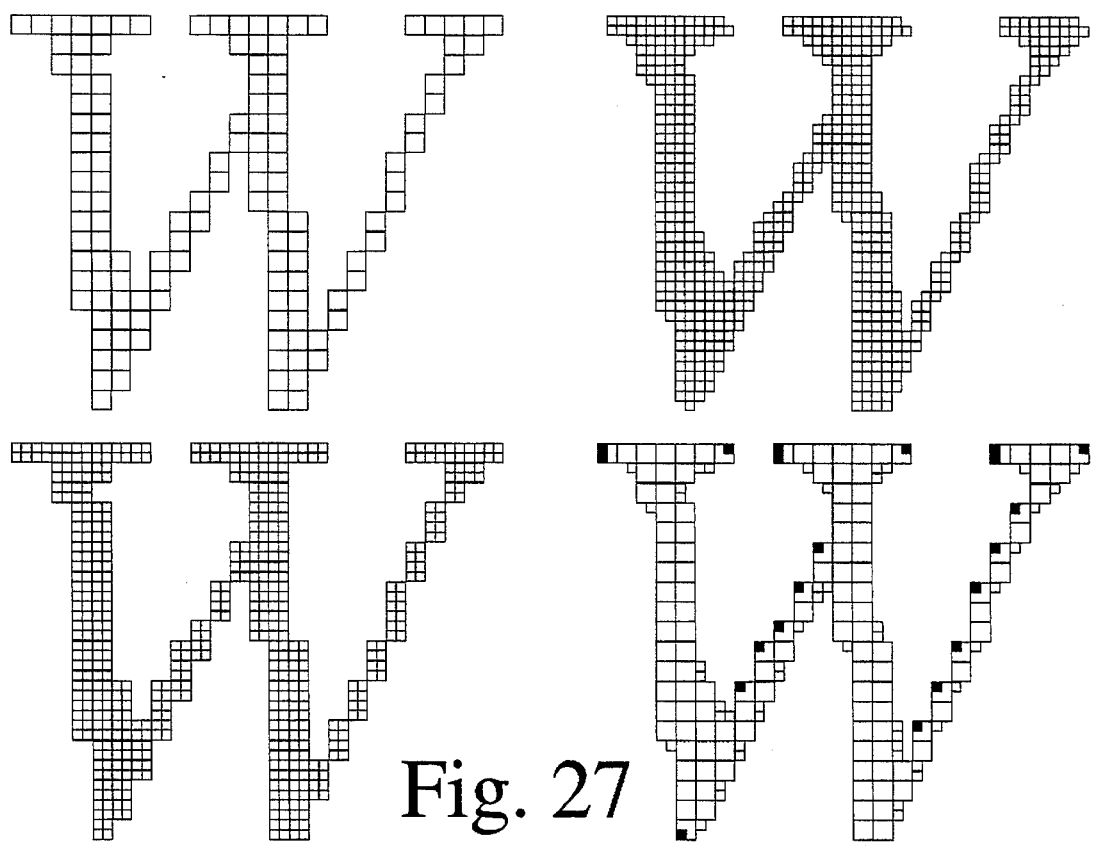
FIG. 27 shows an image that results from interpolating by a shifted bi-cubic B-spline.

Another aspect of the invention with regard to a solution to the quantization error problem overcomes the symmetry of the impulse response by shifting the phase of the basis function. FIG. 26 shows the result of interpolation by a bi-quadratic B-spline with phase shift $\delta=0.1$ and threshold value H=0.56, while FIG. 27 shows the result of interpolation by a cubic B-spline with phase shift $\delta=0.1$ and threshold value H=0.56. The actual amount of phase shifting used is a function of the application to which the invention is put.

Another aspect of the invention with regard to a solution to the quantization error problem combines the two techniques described above, i.e. it uses a phase shifted, Beta-spline interpolant.

Applications

The scheme described herein was applied to two major application areas, e.g. facsimile imaging and font scaling. It should be appreciated that the invention is not limited to these two example applications.

For facsimile imaging in standard mode, the input images are transmitted in standard facsimile resolutions of 203 dpi horizontally and 98 dpi vertically. FIG. 28 shows a portion of the Slerexe letter in standard resolution. In fine mode, the vertical resolution is 196 dpi; FIG. 29 shows a portion of the Slerexe letter in fine resolution.

At the receiving end of the facsimile transmission, printer resolution is typically 300 dpi both ways, 600 dpi horizontally and 300 dpi vertically, or 600 dpi both ways. Therefore, for facsimile imaging the scaling factors are usually fixed numbers. However, because of complications associated with the physical constraints in printable margins of the facsimile printing mechanism, the scaling factor is not actually 300/203 or 300/98. Instead, the scaling factors are rounded off to 3/2 or 3/1 (i.e. 1.5 or 3.0) by padding with extra pixels to fill in the differences encountered in various firmware implementations.

Figures 30, 32:
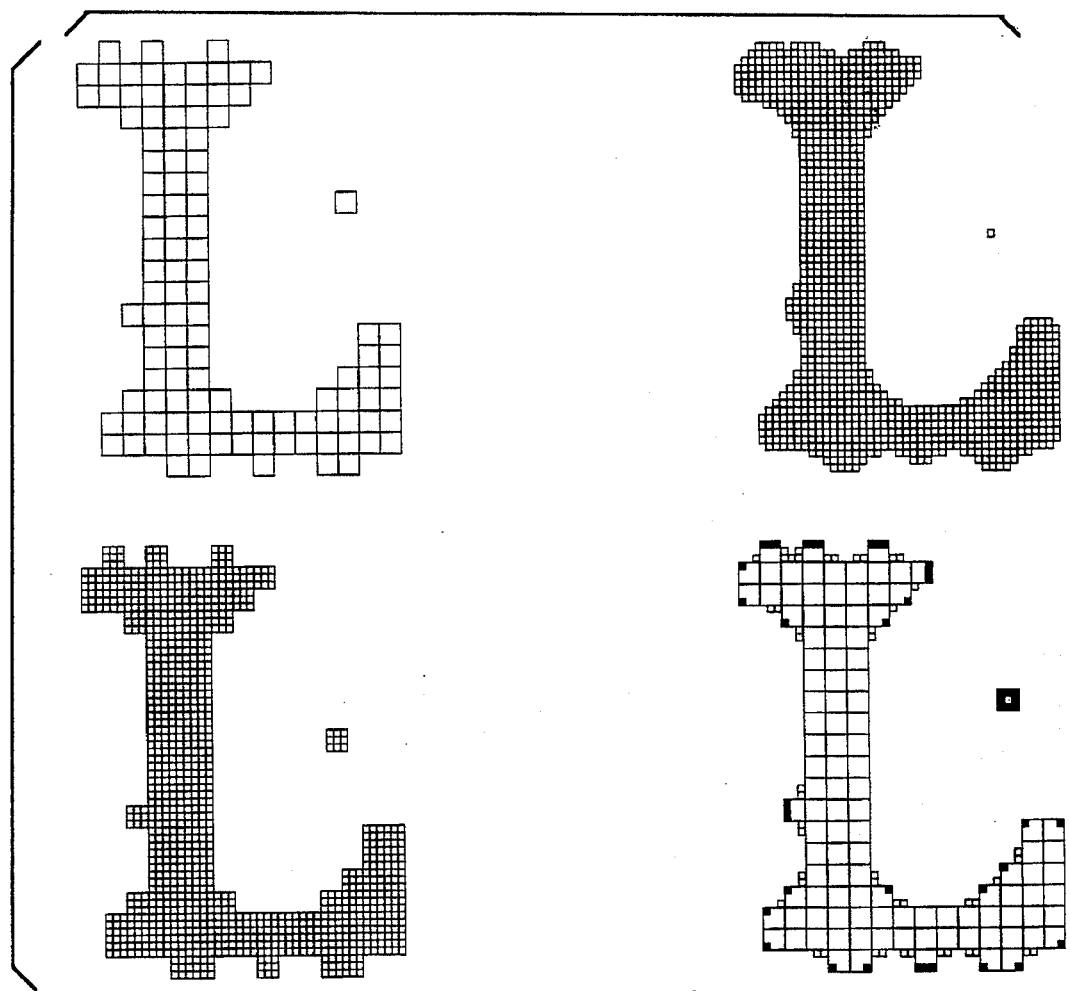
FIG. 30 shows a character cropped from a Slerexe letter.
FIG. 32 shows the result of applying a quadratic-by-quartic tensor product B-spline surface as an interpolant for scaling horizontally by a factor of 3.0 and vertically by a factor of 1.5 in standard resolution.

In addition to binary image scaling, the invention may also be used for image smoothing to remove the aliasing artifacts, as is required in facsimile imaging. FIG. 30 shows a character cropped from the Slerexe letter. The aliasing artifacts shown in the figure include staircases, edge ticks, and stray dots. As a result of applying a bi-cubic tensor product B-spline surface as an interpolant in accordance with the invention herein, the staircases are smoothed, the number of stray dots is reduced, and edge ticks are increased in run length and lowered in height. In fact, stray dots may be detected and totally removed by the invention, if so desired.

FIG. 31 shows the results of applying a bi-cubic B-spline surface as an interpolant for scaling horizontally and vertically by a factor of 3.0 in fine resolution. If it is necessary or desirable to compensate for the 2:1 aspect ratio used in standard resolution, a different order in horizontal direction may be chosen from that of the vertical direction of the fitting surface. FIG. 32 shows the result of applying a quadratic-by-quartic tensor product B-spline surface as an interpolant for scaling horizontally by a factor of 1.5 and vertically by a factor of 3.0 in standard resolution.

Figure 33:
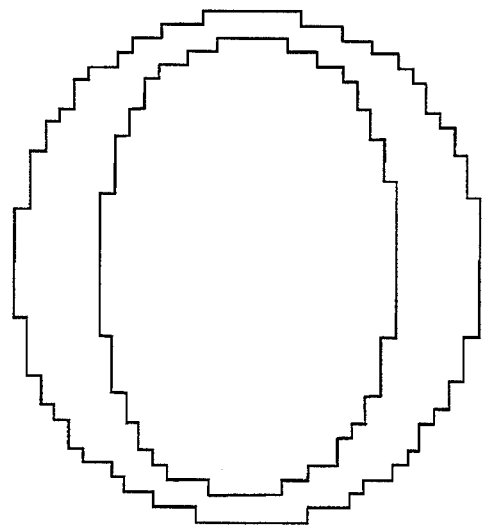
FIG. 33 shows a test character in the original 12 point font at 300 dpi.

The invention may also be used to scale English character fonts. For example, to scale a 12 point font in 300 dpi to a 24 point font for printing on a 600 dpi printer requires scaling by a factor of 4 in both the horizontal and the vertical directions. FIG. 33 shows a test character in the original 12 point font in 300 dpi.

Figure 34:
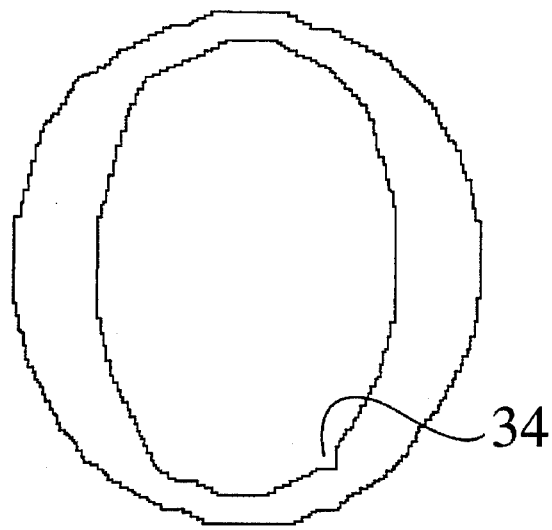
FIG. 34 shows the test character of FIG. 33 scaled two times by RET.

The test character of FIG. 33 may be scaled by twice applying RET (Resolution Enhancement Technology), which uses a set of diamond shaped templates (see C. Tung, *Resolution Enhancement Technology in Hewlett Packard LaserJet Printers*, IST/SPIE Symposium on Electronic Imaging: Science and Technology, pp. 440–448, 1993). FIG. 34 shows the results obtained using this approach. In the figure, it can be seen that artifacts 34 have been introduced along the inside curved portion of the test character at lower right corner by this approach.

Figure 35:
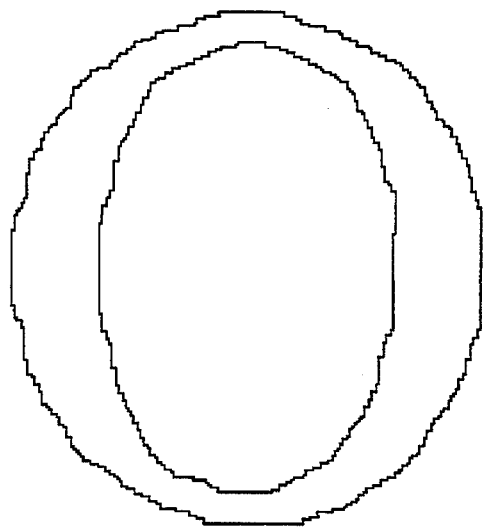
FIG. 35 shows the test character of FIG. 33 scaled by bi-septimal B-splines.

One embodiment of the invention that was applied to the test character involved interpolating by a bi-septimal tensor product B-spline surface using a rectangular template. This approach removes the artifacts, as can be seen in FIG. 35.

Basis Translation Matrices

For each spline basis of order k, $$B = [B_{0,k}(t)\ B_{1,k}(t) \ldots B_{k-1,k}(t)], \tag{28}$$

there exists a basis translation matrix (k by k) $M_k$, such that $$B = TM_k \tag{29}$$

where $T_k$ is the power basis, $$[t^{k-1}\ t^{k-2}\ \ldots\ t\ 1]. \tag{30}$$

Listed below are basis translation matrices for uniform polynomial B-splines of orders linear through septimal.

Linear: (31)

$$M_2 = \begin{bmatrix} -1 & 1 \\ 1 & 0 \end{bmatrix}.$$

Quadratic: (32)

$$M_3 = 1/2 \begin{bmatrix} 1 & -2 & 1 \\ -2 & 2 & 0 \\ 1 & 1 & 0 \end{bmatrix}.$$

Cubic: (33)

$$M_4 = 1/6 \begin{bmatrix} -1 & 3 & -3 & 1 \\ 3 & -6 & 3 & 0 \\ -3 & 0 & 3 & 0 \\ 1 & 4 & 1 & 0 \end{bmatrix}.$$

Quartic: (34)

$$M_5 = 1/24 \begin{bmatrix} 1 & -4 & 6 & -4 & 1 \\ -4 & 12 & -12 & 4 & 0 \\ 6 & -6 & -6 & 6 & 0 \\ -4 & -12 & 12 & 4 & 0 \\ 1 & 11 & 11 & 1 & 0 \end{bmatrix}.$$

Quintic: (35)

$$M_6 = 1/120 \begin{bmatrix} -1 & 5 & -10 & 10 & -5 & 1 \\ 5 & -20 & 30 & -20 & 5 & 0 \\ -10 & 20 & 0 & -20 & 10 & 0 \\ 10 & 20 & -60 & 20 & 10 & 0 \\ -5 & -50 & 0 & 50 & 5 & 0 \\ 1 & 26 & 66 & 26 & 1 & 0 \end{bmatrix}.$$

Hexadic: (36)

$$M_7 = 1/720 \begin{bmatrix} 1 & -6 & 15 & -20 & 15 & -6 & 1 \\ -6 & 30 & -60 & 60 & -30 & 6 & 0 \\ 15 & -45 & 30 & 30 & -45 & 15 & 0 \\ -20 & -20 & 160 & -160 & 20 & 20 & 0 \\ 15 & 135 & -150 & -150 & 135 & 15 & 0 \\ -6 & -150 & -240 & 240 & 150 & 6 & 0 \\ 1 & 57 & 302 & 302 & 57 & 1 & 0 \end{bmatrix}.$$

Septimal: (37)

$$M_8 =$$

$$1/5040 \begin{bmatrix} -1 & 7 & -21 & 35 & -35 & 21 & -7 & 1 \\ 7 & -42 & 105 & -140 & 105 & -42 & 7 & 0 \\ -21 & 84 & -105 & 0 & 105 & -84 & 21 & 0 \\ 35 & 0 & -315 & 560 & -315 & 0 & 35 & 0 \\ -35 & -280 & 665 & 0 & -665 & 280 & 35 & 0 \\ 21 & 504 & 315 & -1680 & 315 & 504 & 21 & 0 \\ -7 & -392 & -1715 & 0 & 1715 & 392 & 7 & 0 \\ 1 & 120 & 1191 & 2416 & 1191 & 120 & 1 & 0 \end{bmatrix}.$$

Sample Convolution Kernels

Listed below are convolution kernels for scaling by a factor of 3 with a bi-cubic uniform polynomial B-spline tensor product surface, s(u,v). $K^{u_0,v_0}$ is the kernel for sampling s(u,v) at $(u_0, v_0)$.

$$K^{0,0} = \frac{1}{36} \begin{bmatrix} 1 & 4 & 1 & 0 \\ 4 & 16 & 4 & 0 \\ 1 & 4 & 1 & 0 \\ 0 & 0 & 0 & 0 \end{bmatrix}. \quad (38)$$

$$K^{0,\frac{1}{3}} = \frac{1}{972} \begin{bmatrix} 8 & 93 & 60 & 1 \\ 32 & 372 & 240 & 4 \\ 8 & 93 & 60 & 1 \\ 0 & 0 & 0 & 0 \end{bmatrix}. \quad (39)$$

$$K^{0,\frac{2}{3}} = \frac{1}{972} \begin{bmatrix} 1 & 60 & 93 & 8 \\ 4 & 240 & 372 & 32 \\ 1 & 60 & 93 & 8 \\ 0 & 0 & 0 & 0 \end{bmatrix}. \quad (40)$$

$$K^{\frac{1}{3},0} = \frac{1}{972} \begin{bmatrix} 8 & 32 & 8 & 0 \\ 93 & 372 & 93 & 0 \\ 60 & 240 & 60 & 0 \\ 1 & 4 & 1 & 0 \end{bmatrix}. \quad (41)$$

$$K^{\frac{1}{3},\frac{1}{3}} = \frac{1}{26244} \begin{bmatrix} 64 & 744 & 480 & 8 \\ 744 & 8649 & 5580 & 93 \\ 480 & 5580 & 3600 & 60 \\ 8 & 93 & 60 & 1 \end{bmatrix}. \quad (42)$$

$$K^{\frac{1}{3},\frac{2}{3}} = \frac{1}{26244} \begin{bmatrix} 8 & 480 & 74 & 64 \\ 93 & 5580 & 8649 & 744 \\ 60 & 3600 & 5580 & 480 \\ 1 & 60 & 93 & 8 \end{bmatrix}. \quad (43)$$

$$K^{\frac{2}{3},0} = \frac{1}{972} \begin{bmatrix} 1 & 4 & 1 & 0 \\ 60 & 240 & 60 & 0 \\ 93 & 372 & 93 & 0 \\ 8 & 32 & 8 & 0 \end{bmatrix}. \quad (44)$$

$$K^{\frac{2}{3},\frac{1}{3}} = \frac{1}{26244} \begin{bmatrix} 8 & 93 & 60 & 1 \\ 480 & 5580 & 3600 & 60 \\ 744 & 8649 & 5580 & 93 \\ 64 & 744 & 480 & 8 \end{bmatrix}. \quad (45)$$

$$K^{\frac{2}{3},\frac{2}{3}} = \frac{1}{26244} \begin{bmatrix} 1 & 60 & 93 & 8 \\ 60 & 3600 & 5580 & 480 \\ 93 & 5580 & 8649 & 744 \\ 8 & 480 & 74 & 64 \end{bmatrix}. \quad (46)$$

Accordingly, the invention provides an image scaling method that is based on piecewise polynomial interpolation. The invention may be used for arbitrary or fixed scaling factors, and it may also be used to reduce or remove aliasing artifacts.

The invention described herein has at least the following advantages:

It is a formal model that provides a systematic way of generating convolution kernels for image scaling that are useful for solving the quantization error problem that affects all polynomial interpolants.

It provides a scheme that determines numeric values that are used to control the weights of the neighboring input pixels. By adjusting the mathematical computations applied by the invention, the specific implementation of the invention may be fine tuned for the best print quality, subject to various design parameters, such as pen, ink, paper, carriage speed, and ROM size.

It provides a table lookup scheme suitable for hardware implementation using known hardware techniques. The lookup table size may be substantially reduced to meet the memory space constraints.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

I claim:

1. A computer-implemented method for binary image scaling by piecewise polynomial interpolation within the memory of a computer device, comprising the steps of:

modeling binary data representing an input pixel image as a three-dimensional data set comprising X, Y, Z, in which the X and Y coordinates are input pixel image dimensions, and the Z coordinate is the intensity of the original pixel image;

fitting said three-dimensional data set by a surface interpolant;

determining the type and the degree of the piecewise polynomial interpolant for surface fitting based on the image scaling factor;

resampling said binary data representing said input pixel image on said fitting surface to provide interpolative data;

correcting for any quantization error problems in said interpolative data, if necessary;

thresholding said interpolative data to produce binary data representing an output pixel image; and producing said output pixel image, wherein said output pixel image is scaled from said input pixel image.

2. The method of claim 1, wherein said interpolant is a B-spline tensor product surface.

3. The method of claim 1, wherein said interpolant is a Beta-spline tensor product surface.

4. The method of claim 1, further comprising the steps of:

phase shifting during said resampling step to realign said sampling location with respect to said scaling factor.

5. The method of claim 4, further comprising the step of:

determining the amount of phase shifting for solving the quantization error problem.

6. The method of claim 1, further comprising the step of:

determining threshold values that are used to produce binary output pixels.

7. The method of claim 1, further comprising the steps of:

determining values that are used to control weights of neighboring input pixels;

pre-calculating said weights for fixed scaling factors; and performing a convolution by table lookup.

8. The method of claim 7, further comprising the step of:

fine tuning said table lookup.

9. The method of claim 8, further comprising the steps of:

reducing table lookup size by the locality detected in said convolution kernels;

reducing table lookup size by the symmetry detected in said convolution kernels; and reducing table lookup size by keeping only the most dominant entries of the convolution kernels.

10. The method of claim 8, further comprising the step of:

manually modifying the entries of the lookup table, whereby aliasing artifacts are substantially removed.

11. A computer device-implemented system for binary image scaling by piecewise polynomial interpolation, comprising:

an input module for receiving binary data representing an input pixel image as a three-dimensional data set comprising X, Y, Z, in which the X and Y coordinates are input pixel image dimensions, and the Z coordinate is the intensity of the original pixel image;

a surface fitting module for fitting said three-dimensional data set by a surface;

means for determining the type and degree of the piecewise polynomial interpolant for surface fitting based on the scaling factor;

a resampling module for resampling said binary data representing said input pixel image on said fitting surface with weights determined by type of interpolant, its degree, and scaling factor, to provide interpolative data;

a correction module for correcting any quantization error problems in said interpolative data;

a thresholding module for thresholding said interpolative data to produce binary data representing an output pixel image; and an output module for producing said output pixel image from said binary data, wherein said output pixel image is scaled from said input pixel image.

12. The apparatus of claim 11, wherein said interpolant is a B-spline tensor product surface.

13. The apparatus of claim 11, wherein said interpolant is a Beta-spline tensor product surface.

14. The apparatus of claim 11, further comprising:

means for phase shifting during said resampling step to realign said sampling location with respect to said scaling factor.

15. The apparatus of claim 14, further comprising:

means for determining the amount of phase shifting for solving the quantization error problem.

16. The apparatus of claim 11, further comprising:

means for determining threshold values that are used to produce binary output pixels.

17. The apparatus of claim 11, further comprising:

means for determining values that are used to control weights of neighboring input pixels;

means for pre-calculating said weights for fixed scaling factors; and means for performing a convolution by table lookup.

18. The apparatus of claim 17, further comprising:

means for fine tuning said table lookup.

19. The apparatus of claim 18, further comprising:

means for reducing table lookup size by the locality detected in said convolution kernels;

means for reducing table lookup size by the symmetry detected in said convolution kernels; and means for reducing table lookup size by keeping only the most dominant entries of the convolution kernels.

20. The apparatus of claim 18, further comprising:

means for manually modifying the entries of the lookup table, whereby aliasing artifacts are substantially removed.

* * * * *